(12) United States Patent
Flannery et al.

(10) Patent No.: US 6,362,899 B1
(45) Date of Patent: Mar. 26, 2002

(54) ERROR DETECTION APPARATUS AND METHOD FOR USE WITH ENGRAVERS

(75) Inventors: David L. Flannery, Englewood; Thomas P. Staub, Dayton; David R. Seitz, Vandalia, all of OH (US)

(73) Assignee: MDC Max Daetwyler AG (CH)

( * ) Notice: Subject to any disclaimer, the term of this patent is extended or adjusted under 35 U.S.C. 154(b) by 0 days.

(21) Appl. No.: 09/055,518

(22) Filed: Apr. 6, 1998

Related U.S. Application Data

(63) Continuation-in-part of application No. 08/476,093, filed on Jun. 7, 1995, now Pat. No. 5,737,091, which is a continuation of application No. 08/125,938, filed on Sep. 23, 1993, now Pat. No. 5,440,398, which is a continuation-in-part of application No. 08/038,679, filed on Mar. 26, 1993, now Pat. No. 5,438,422, which is a continuation-in-part of application No. 08/022,127, filed on Feb. 25, 1993, now Pat. No. 5,424,845.

(51) Int. Cl.⁷ .............................................. B41C 1/045

(52) U.S. Cl. ....................................... 358/1.9; 382/192

(58) Field of Search ....................... 358/1.9, 299, 298; 382/141, 144

(56) References Cited

U.S. PATENT DOCUMENTS

| 2,493,628 A | 1/1950 | Harley ........................... 88/14 |
|---|---|---|
| 2,777,058 A | 1/1957 | Bovajean ..................... 250/27 |

(List continued on next page.)

FOREIGN PATENT DOCUMENTS

| EP | 0 595 324 | 5/1994 |
|---|---|---|
| WO | WO 96/31349 | 10/1996 |

OTHER PUBLICATIONS

"Portascan–Portascan Gives the Printer or Engraver all the Cell Information He Requires", Scan Systems, Manchester, Manchester, Brazil, Unda.

"Imagen HR 1024 Series High Resolution Video Measuring System", Optech Instrument Corp., Greenvale, New York, Publication No. HR–10, Jan., 1991.

The Gravure Association of America, *The Engraving Manual* (1987).

Balcom, *Basic Rotogravure* (1988).

(List continued on next page.)

*Primary Examiner*—Thomas D. Lee
*Assistant Examiner*—Stephen Brinich
(74) *Attorney, Agent, or Firm*—Jacox, Meckstroth & Jenkins

(57) ABSTRACT

An error detection apparatus and method for use with engravers, such as gravure engravers. An error value E corresponding to the difference between a set of predetermined setup parameters and actual measurement of a portion of an engraved area on the cylinder is determined. The error value E is then used to adjust the engraver to engrave an actual cut or etch in accordance with the set of predetermined setup parameters. The error detection and correction system is suitable for providing a closed-loop system for engraving a cylinder. The apparatus and method may be used during initial setup or during normal operation of the engraver. A method is disclosed comprising the steps of engraving ink receptive cells in the surface of a rotating gravure printing cylinder consisting of the steps of generating a cell width command signal comprising a series of cell width commands, engraving the cells by using the cell width command signal to urge an engraving stylus into periodic engraving contact with the surface, measuring actual widths of cells which have been engraved as aforesaid, and adjusting the cell width command signal in correspondence with differences between the actual widths and the cell width commands.

47 Claims, 17 Drawing Sheets

U.S. PATENT DOCUMENTS

| | | | |
|---|---|---|---|
| 2,874,479 A | 2/1959 | Farber | 33/189 |
| 2,943,564 A | 7/1960 | Demer | 101/93 |
| 3,612,753 A | 10/1971 | Korman | 178/5.2 |
| 3,652,992 A | 3/1972 | Koll | 340/146 |
| 3,769,455 A | 10/1973 | DeVos et al. | 178/6.6 |
| 3,876,829 A | 4/1975 | Schreiber | 178/7.3 |
| 3,904,816 A | 9/1975 | Taudt et al. | 178/6 |
| 3,918,348 A | 11/1975 | Runft | 90/11 |
| 3,931,570 A | 1/1976 | George et al. | 324/34 |
| 3,956,583 A | 5/1976 | Pugsley | 178/6.6 |
| 4,001,950 A | 1/1977 | Tauszig | 358/294 |
| 4,003,311 A | 1/1977 | Bardin | 101/426 |
| 4,012,584 A | 3/1977 | Gascoinge | 358/302 |
| 4,052,739 A | 10/1977 | Wada et al. | 358/299 |
| 4,072,928 A | 2/1978 | Wilder | 340/146 |
| 4,075,662 A | 2/1978 | Gall | 358/280 |
| 4,240,118 A | 12/1980 | Wellendorf | 358/296 |
| 4,315,285 A | 2/1982 | Sommer et al. | 358/280 |
| 4,342,050 A | 7/1982 | Traino | 358/256 |
| 4,363,037 A | 12/1982 | Traudt | 358/296 |
| 4,394,693 A | 7/1983 | Shirley | 358/296 |
| 4,437,122 A | 3/1984 | Walsh et al. | 358/166 |
| 4,451,856 A | 5/1984 | Buechler | 358/299 |
| 4,503,468 A | 3/1985 | Serinken et al. | 358/256 |
| 4,612,584 A | 9/1986 | George | 358/299 |
| 4,683,499 A | 7/1987 | Kawabara | 358/269 |
| 4,683,500 A | 7/1987 | Kitamura et al. | 358/280 |
| 4,691,229 A | 9/1987 | Colditz | 358/76 |
| 4,691,238 A | 9/1987 | Yamada | 358/280 |
| 4,700,235 A | 10/1987 | Gall | 358/283 |
| 4,800,287 A | 1/1989 | Green Sr. et al. | 250/560 |
| 4,944,593 A | 7/1990 | Kalstroem | 356/379 |
| 4,972,323 A | 11/1990 | Cauwet | 364/474 |
| 5,029,011 A | 7/1991 | Fraser | 358/299 |
| 5,229,861 A | 7/1993 | Nozaka et al. | 358/299 |
| 5,293,426 A | 3/1994 | Wouch et al. | 382/1 |
| 5,416,597 A | 5/1995 | Mubaslat | 358/299 |
| 5,422,958 A | 6/1995 | Wouch et al. | |
| 5,424,845 A | 6/1995 | Holowko et al. | 358/299 |
| 5,438,422 A | 8/1995 | Holowko | 358/299 |
| 5,440,398 A | 8/1995 | Holowko et al. | 358/299 |

OTHER PUBLICATIONS

Heimann GmbH, *Drucktechnische Beratung–Graphischer Handel* (Pamphlet, Hamm, Germany, 1994).

Heimann GmbH, *Check–Master* (Pamphlet, Date Unknown).

Ahauser Tiefdruck–Gravuren GmbH & Co., *Engraving Tester ET 2000* (Pamphlet, Date Unknown).

Promatec Graphique, *M2B2 modele depose MICRO SURFACE Sarl* (Pamphlet, Antony, France, 1987).

*VIP—Video, Image, Processing* (Pamphlet, Author Unknown, Date Unknown).

*Computer Vision* by Dana H. Ballard and Christopher M. Brown, Prentice–Hall, Englewood Cliffs, New Jersey, 1982, Chapters 1–6.

*Automated Visual Inspection* by B. G. Batchelor, D. A. Hill and D. C. Hodgson, IFS (publications) Ltd., UK and North–Holland (A Division of Elsevier Science Publishers BV), 1985, pp. 56–59, 81–83, 284–287, 290 and 291.

*Digital Picture Processing*, Second Edition, vol. 2, by Azreil Rosenfeld and Ayinash C. Kak, Academic Press, Inc., Orlando, Florida, 1982, pp. 84–153.

"Image Processing Algorithms for Industrial Vision" by Gerald J. Agin, SRI International, Feb. 9, 1979.

"Video Calipers" Market Memo to P.I.D. dealers by D. J. Joerger, Dec. 19, 1988.

"Video Microscope Measruing Systems", TM Bradwell International Inc., Elmhurst, Ill., 1991.

"Portascan–A NewDimension in Microscopic Measurement", Bradwell International, Inc., Elmhurst, Illinois, 1991.

"Cellscan 90", Bradwell International, Inc., Elmhurst, IL, undated brochure.

"Numerical Analysis: A Practical Approach", by Melvin J. Maron, p. 188.

"The Image Processing Handbook", by John C. Russ, pp. 105–113 (1992).

"Numerical Recipes in C—The Art of Scientific Computing", by William H. Press, Brian R. Flannery, Saul A. Teukolosy and William T. Vetterling, pp. 452–460, 1988.

"Datwyler", Max Daetwyler Corporation, 13420 West Reese Blvd., Huntersville, NC 28078, undated brochure.

"Twin–Pilot", Maschinenfabrik Kaspar Walter GmbH & Co. KG, Plinganserstrasse 22, 8000 Munchen 70, Germany, undated brochure.

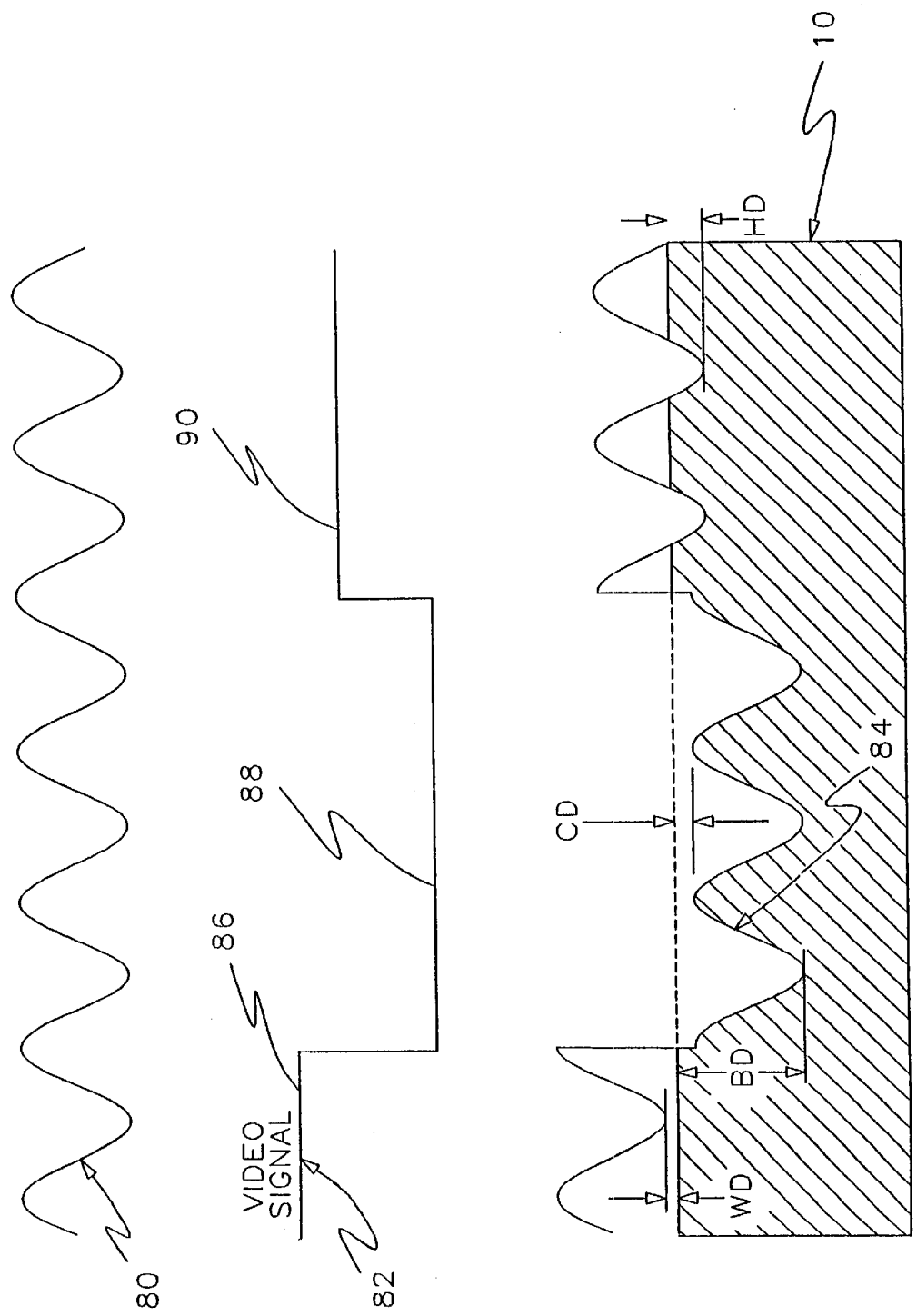

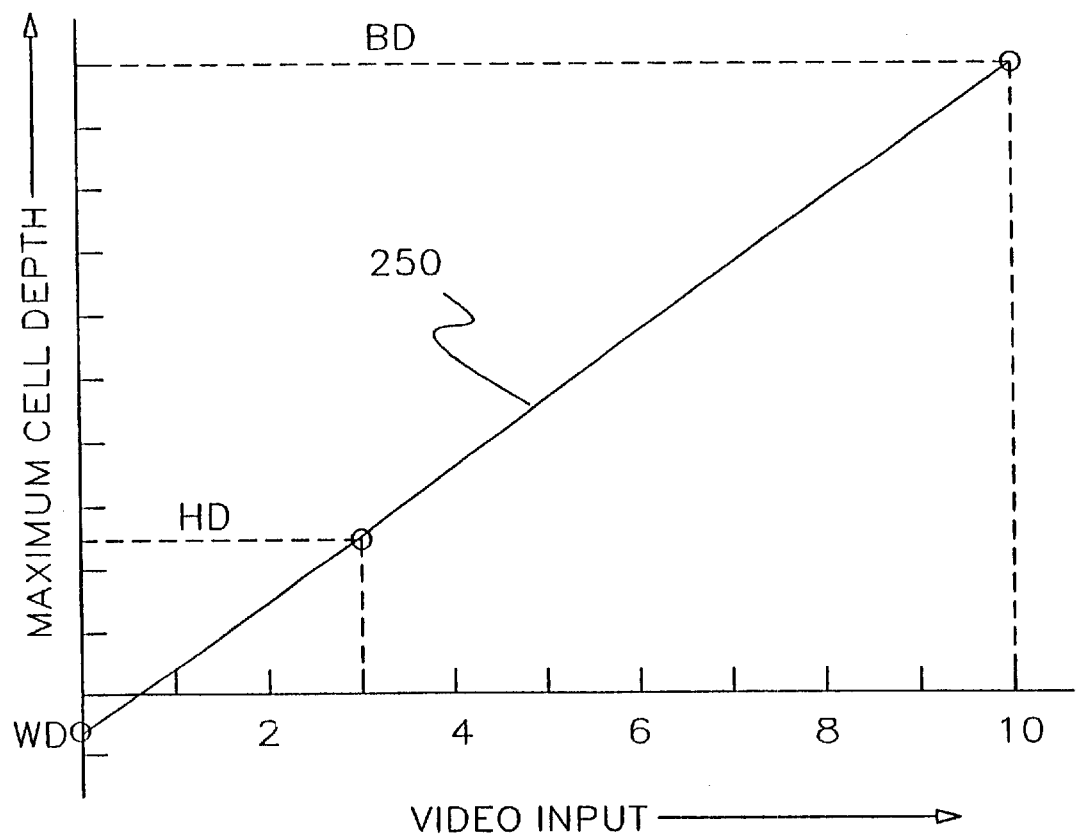

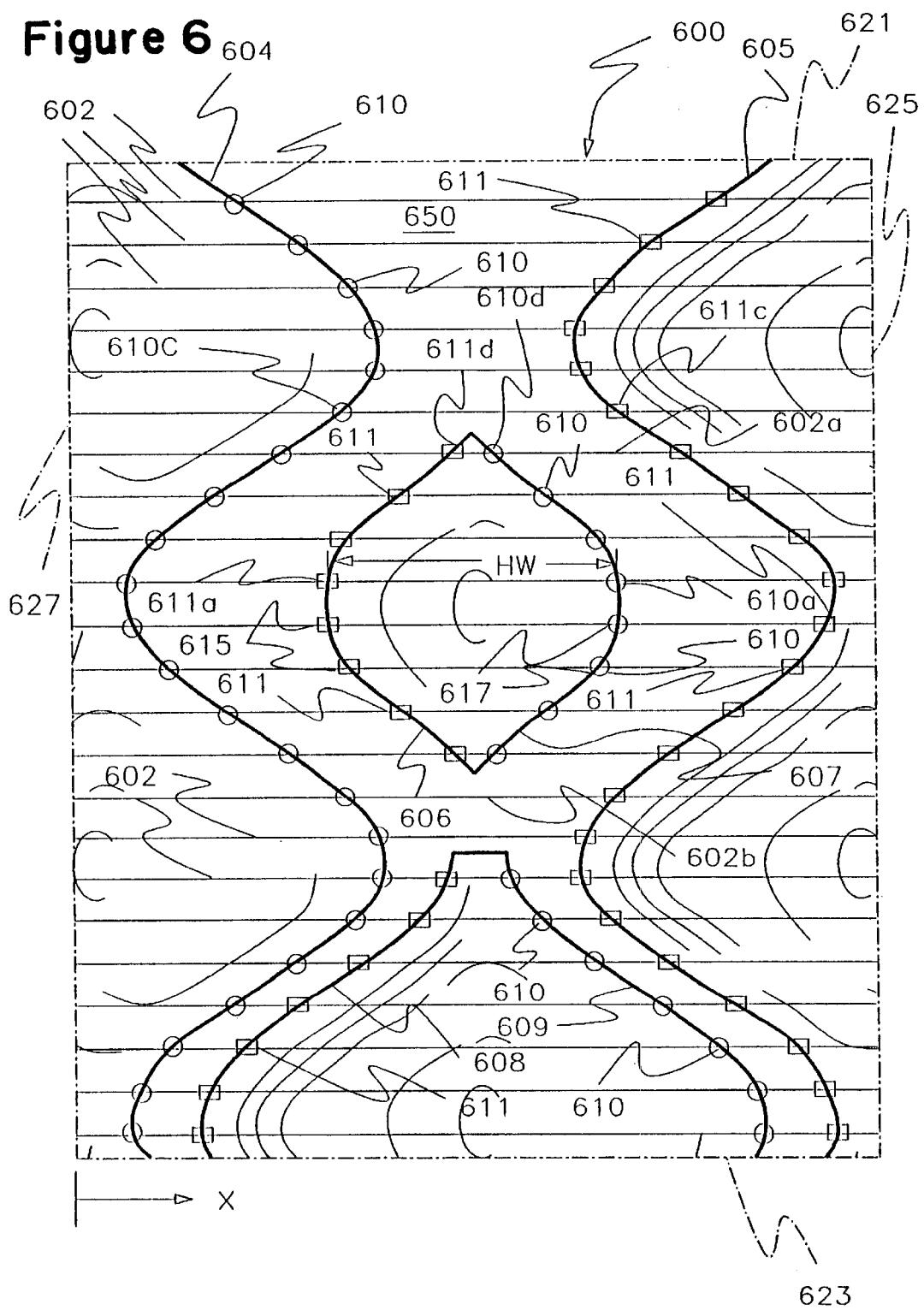

ERROR DETECTION APPARATUS AND METHOD FOR USE WITH ENGRAVERS

CROSS-REFERENCE TO RELATED APPLICATION

This application is a continuation-in-part of Ser. No. 08/476,093 filed Jun. 7, 1995, now U.S. Pat. No. 5,737,091, which is a continuation of Ser. No. 08/125,938, filed Sep. 23, 1993, now U.S. Pat. No. 5,440,398, which is a continuation-in-part of Ser. No. 08/038,679, filed Mar. 26, 1993, now U.S. Pat. No. 5,438,422, which is a continuation-in-part of Ser. No. 08/022,127, filed Feb. 25, 1993 now U.S. Pat. No. 5,424,845.

BACKGROUND OF THE INVENTION

This invention relates to engraving heads of the general type disclosed in Buechler U.S. Pat. No. 4,450,486. Such engraving heads comprise a diamond stylus carried by a holder mounted on an arm projecting from a torsionally oscillated shaft. A sine wave driving signal is applied to a pair of opposed electromagnets to rotate the shaft through a maximum arc of approximately 0.25° at a frequency in the neighborhood of about 3,000 to 5,000 Hz.

A guide shoe is mounted on the engraving head in a precisely known position relative to the oscillating stylus. The engraving head is supported for tilting movement by a set of leaf springs secured to a rearwardly projecting bar. A DC motor rotates the bar so as to bring the guide shoe into contact with a printing cylinder to be engraved. When the guide shoe is in contact with the printing cylinder, the stylus oscillates from a position just barely touching the printing cylinder to a retracted position about 100 microns distant from the surface of the cylinder.

Once the guide shoe is in contact against the printing cylinder a video signal is added to the sine wave driving signal for urging the oscillating stylus into contact with the printing cylinder thereby engraving a series of controlled depth cells in the surface thereof. The printing cylinder rotates in synchronism with the oscillating movement of the stylus while a lead screw arrangement produces axial movement of the engraving head so that the engraving head comes into engraving contact with the entire printing surface of the printing cylinder.

In engraving systems of the type taught by Buechler, it is necessary for the machine operator to perform a tedious trial and error setup procedure at one end of the printing cylinder prior to commencement of engraving. This procedure involves adjustment of the gain on amplifiers for the sine wave driving signal and the video signal so as to produce "black" printing cells of a desired depth together with connecting channels of another desired depth and clean non-engraved white cells. Each change of one of the control variables interacts with the others, and therefore the setup becomes an iterative process. Even after a proper setup has been achieved, cell depth errors may accumulate due to mechanical drifting.

Engraving errors of a particularly serious nature occur when the engraving stylus becomes overstressed and fractures. Such a failure can completely ruin a nearly completed printing cylinder, if not detected immediately. Heretofore there has been no way of quickly and automatically detecting such a condition.

It is therefore seen that a need has existed for an engraving system which may be quickly and easily set up to engrave cells of precisely controlled dimensions in the surface of a gravure printing cylinder. A further need has existed to avoid error accumulation during engraving.

In the past, electronic images of cells engraved on cylinders were captured with a charged-coupled-device (CCD) and digitally processed to obtain estimates of the cell dimensions. The digital image of the cell captured is converted to a binary image which was efficiently encoded in chord tables. Each chord was assigned a label which was unique to a segmented region, with each segmented region being an individual engraved area.

In order to calculate dimensional estimates based on the information contained in a digital presentation of the image, the engraving system imager of the past had a transverse magnification factor which was dependent upon the optical system used in the imager. In the past, transverse magnification factor for each individual system was typically measured and calibrated using a device, such as a reticule, which was usually more accurate than the system being calibrated. Thus, it should be appreciated that the calibration of camera systems of the past was typically performed using independent devices.

What is needed, therefore, is a system and method for improving the accuracy of measurements and which utilize the advantages of error correction systems of the past and which are also capable of automatic or self-calibration, without the need for additional instruments or tools.

SUMMARY OF THE INVENTION

In one aspect, this invention provides a method for adjusting an engraver to engrave a cylinder with an actual cut according to predetermined setup parameters, said method comprising the steps of: (a) determining an observed error corresponding to the difference between a cell dimension command and a measured value of the resulting dimension in an engraved cell; and (b) adjusting the cell dimension command in a manner which eliminates the observed error.

In another aspect, this invention provides an apparatus and method for measuring the width of an engraved printing cell by sensing black/white transactions in scanned lines of video information.

The present invention also provides an engraving apparatus and method wherein a plurality of parameter signals are supplied to a computer for generating an engraving width command. An input AC signal and an input video signal are applied to the computer for multiplication by multiplication factors which are generated in response to the input parameter signals. The computer also generates a white offset signal which is combined with the processed AC and video signals to produce a driving signal for the engraving stylus. The stylus then engraves cells of the desired geometry.

A video camera is operated to produce a frame of video information including an image of a highlight cell which has been engraved by a video signal of a predetermined level. A video processing circuit measures the width of the cell which has been so imaged and reports it to the computer. The computer then adjusts the multiplication factors and the white offset through use of a correction parameter which is generated on a closed loop basis by cumulating differences between the expected cell width and the measured cell width.

The invention additionally provides a method and apparatus for quickly and automatically detecting cell width errors which are outside a predetermined limit. A repeated occurrence of such large magnitude errors is considered indicative of a broken stylus and automatically terminates the engraving operation.

In another aspect this invention comprises, an image system for imaging engraved areas on engraved workpieces comprising, an imager for imaging a plurality of engraved areas on a workpiece for capturing an image of the plurality of engraved areas and for generating a pixel array corresponding thereto and a processor coupled to the imager for using said pixel array to generate a calibration factor for use when determining actual measurements for engraved areas subsequently imaged by said imager.

In still another aspect, this invention comprises an engraver for engraving a cylinder comprising, an engraving head for engraving a plurality of engraved areas on the cylinder, a processor for controlling the operation of the engraving head and an imager for imaging a plurality of engraved areas on a workpiece for capturing an image of the plurality of engraved areas and for generating a pixel array corresponding thereto, the processor using the pixel array to generate a calibration factor for use when determining actual measurements for engraved areas subsequently imaged by the imager.

In yet another aspect, this invention comprises a method of calibrating an image system for imaging engraved areas on a workpiece engraved by an engraver, the method comprising the steps of capturing an image of the engraved areas and generating a pixel array in response thereto, generating a calibration factor using the pixel array and a screen variable associated with a desired screen for the engraved areas and using the calibration factor to determine a measurement for at least one of the engraved areas.

In still another aspect, this invention comprises a method of engraving comprising the steps of mounting a workpiece on an engraver, capturing an image of engraved areas on the workpiece and generating a pixel array in response thereto, generating a calibration factor using the pixel array and a screen variable associated with a desired screen for the engraved areas and using the calibration factor to determine a measurement for at least one of the engraved areas, adjusting the engraver in response to the measurement, engraving second engraved areas after performing the adjusting step.

An object of this invention is to provide an image system for use alone or in combination with an engraver which is capable of automatic or self-calibration to provide improved accuracy in measurements of areas being measured.

Another object of the invention is to provide an improved engraving system and method which will provide improved closed-loop error correction utilizing improvements in the accuracy of measurements of imaged engraved areas.

Still another object of the invention is to provide a system and method for determining a real unit value for a dimension of each pixel in a pixel array which may be subsequently utilized for calibrating an image system to provide measurements of subsequently-imaged engraved areas.

Still another object of the invention is to provide an improved measurement system and method which will not only facilitate improving closed-loop, real time operation, but may also be utilized on or in conjunction with engravers which engrave flexographic rolls or plates, as well as gravure cylinders.

Other objects and advantages of the invention will be apparent from the following description, the accompanying drawings, and the appended claims.

BRIEF DESCRIPTION OF THE DRAWINGS

FIG. 3 is a schematic illustration of AC and video signals for controlling an engraving stylus and the engraving movement which results therefrom;

FIG. 5 is a graphical plot of the maximum cell depths resulting from video input signals ranging from 0 to 10 volts;

FIG. 6 is a schematic illustration of a video frame including a highlight cell;

DESCRIPTION OF THE PREFERRED EMBODIMENT

Figure 1:
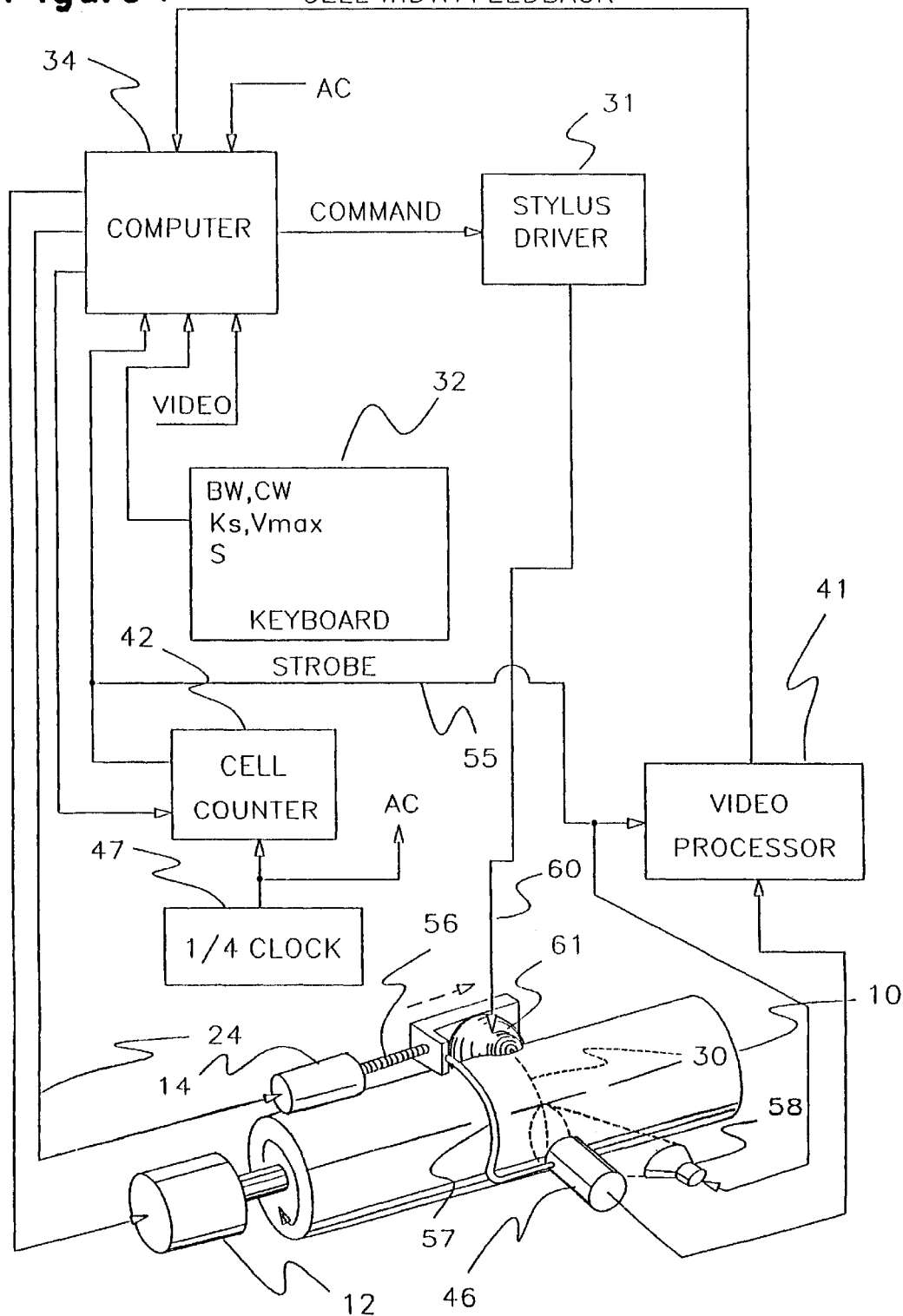
FIG. 1 is a schematic illustration, partly in perspective, of a programmable engraving system according to the present invention.

Referring to FIG. 1 there is illustrated a gravure printing cylinder 10 mounted for rotation by a drive motor 12 and engraving by an engraving stylus (not illustrated) carried by an engraving head 61. During the engraving operation, the stylus moves engravingly toward and away from printing cylinder 10 to produce a series of cells arranged along a track 30. A lead screw motor 14 rotates a leadscrew 56 to cause movement of the stylus in a direction parallel to the axis of cylinder 10. If lead screw motor 14 moves continuously, then track 30 will have a helical configuration. Intermittent energization of motor 14 produces a series of spaced circular tracks 30.

The engraving stylus is driven into engraving contact with print cylinder 10 by an electromagnetic driver (not illustrated) operating in response to a drive control signal on line 60. The drive control signal is generated by an amplifier 31 which amplifies a command signal produced by a computer 34. The electromagnetic driver may be configured as generally disclosed in Buechler, U.S. Pat. No. 4,450,486.

The command signal has an AC component, a video component and a white offset component, WD, appropriate for producing an engraving action as hereinafter described. The AC component is derived from an AC input signal which is applied to computer 34 and multiplied by a gain factor Ka. The video component is generated within computer 34 by taking an input video signal and multiplying it by a gain factor Kd.

Computer 34 generates the parameters Ka, Kd and WD by solving a set of three equations as described below. A keyboard 32 is provided in order to enable entry of values for setup parameters appearing in the three equations. These parameters are black cell width, BW, channel width CW, a stylus constant, Ks, and the black cell voltage, Vmax. A shoe offset, S, may also be entered if desired.

As hereinafter discussed in more detail, the AC component of the command signal causes the stylus to oscillate in a sinusoidal manner relative to printing cylinder 10 with a wavelength dependent upon the surface speed of the cylinder. The rotational speed of drive motor 12 must be adjusted so as to produce an engraving track 30 having an odd number of half wavelengths during a full engraving rotation. Computer 34 transmits a lead screw control signal to lead screw motor 14 via a line 24. This signal is adjusted so as to cause lead screw motor 14 to advance the stylus an axial distance equal to one-half of a black cell width plus one-half of a connecting channel width, plus one separating wall width during each complete rotation of the printing cylinder 10.

The equations for Ka, Kd and WD assume a linear relationship between the input video signal and a resultant engraved cell width. While this is a fairly accurate assumption in many cases, there are times when adjustments are required. If so, then tabulated corrections may be made as taught in Ser. No. 08/022,127 now issued as U.S. Pat. No. 5,424,845, the parent application hereof, the disclosure of which is incorporated herein by reference.

Another problem is drift. Although computer 34 may be programmed properly and may initially produce correct cell widths, gain changes in analog components or mechanical changes in the positioning of engraving head 61 may require incorporation of an adjustable correction parameter in the equations employed for calculation of Ka, Kd and WD. For this purpose there is a video camera 46 which is focussed on track 30. Camera 46 views a portion of track 30 which is illuminated by a strobed lamp 58 and provides frames of video feedback information to a video processor 41. Strobe signals for lamp 58 are provided at the correct frequency and phase by a cell counter 42 on line 55. Cell counter 42 or means for counting cells counts pulses generated by a clock 47 at four times the AC frequency. At this frequency a clock pulse is generated each quarter wavelength of engraving stylus oscillation.

Video camera 46 is mounted on a frame 57 supported by leadscrew 56. Camera 46 is adjustable relative to frame 57 so as to generate frames of video information which are centered upon track 30. Preferably, camera 46 comprises a CCD array which produces a new frame of video information with each flash of lamp 58. Preferably lamp 58 and video camera 46 are combined into a unit with a common lens (not illustrated) so that video camera 46 views the cylinder area which is illuminated by flashes from lamp 58. Preferably, also, the video camera 46 is an autofocus camera which can focus on surfaces over a range of distances. The video processor 41 is capable of controlling the autofocus feature, so that camera 46 may provide focussed video information from the surfaces of printing cylinders of different radii.

Figure 2:
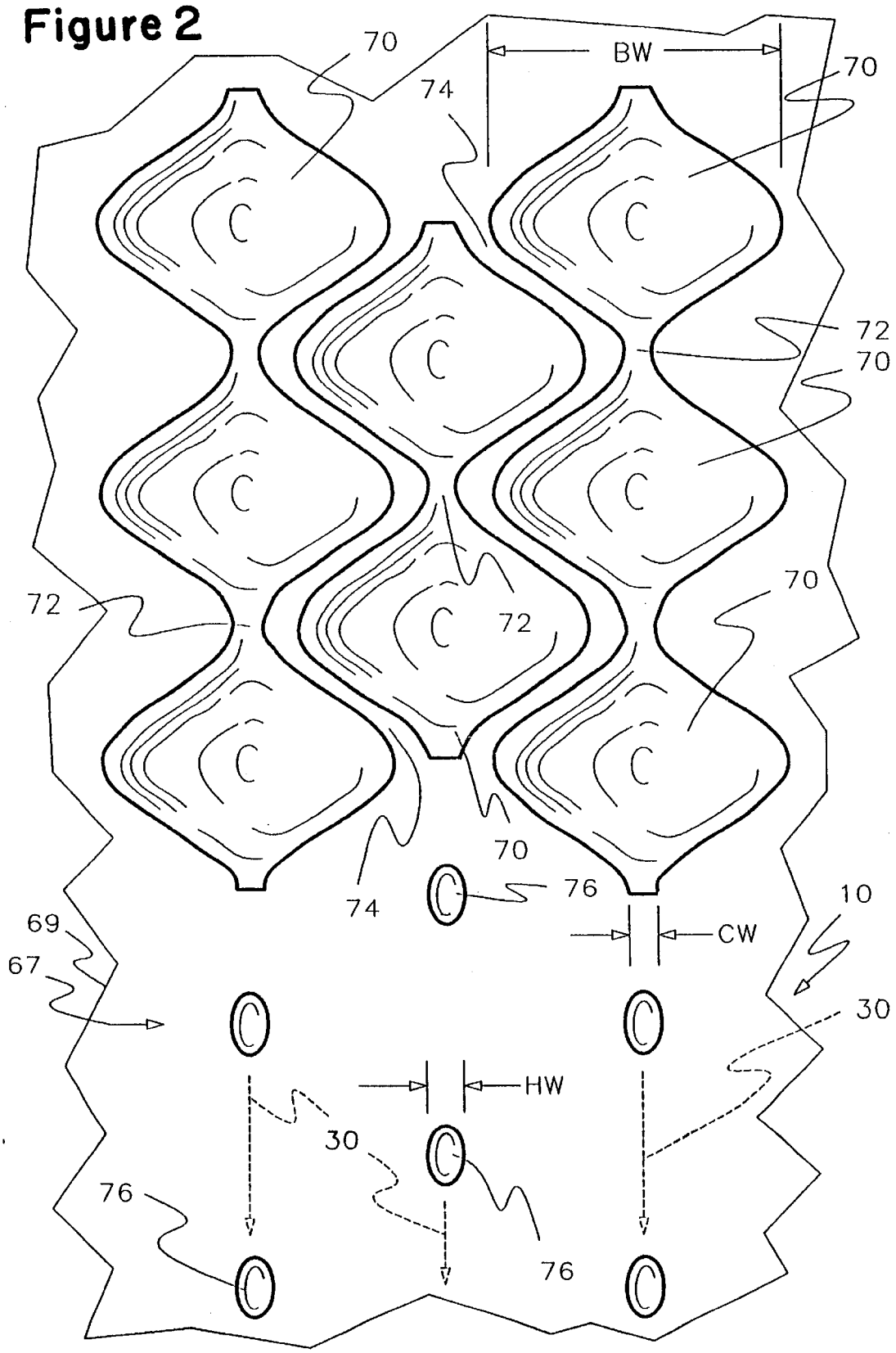
FIG. 2 is a schematic illustration of a series of cells engraved in a printing cylinder.

The geometrical configurations of typical black cells, connecting channels for black cells, highlight cells and separating walls are illustrated in FIG. 2. That figure depicts a series of wide, deep black cells 70 and a series of shallower and narrower highlight cells 76. The illustrated cells comprise portions of three side-by-side engraving tracks 30. Black cells 70 have a maximum width BW. The control signal for the stylus is adjusted so as to produce connecting channels 72 between successively engraved black cells 70. Channels 72 have a width CW, while highlight cells 76 have a width HW. The scalloped edges of the cells 70 result from the vertically oscillating cutting action of the stylus during rotational movement of printing cylinder 10 thereunder. As further illustrated in FIG. 2, a series of successively engraved black cells 70 may be separated by a wall 74 from a series of successively engraved cells 70 (also illustrated as being black cells) in an adjacent engraving track 30.

A series of cells configured as illustrated in FIG. 2 will print a graphic pattern defining a diagonally extending screen. The tangent of the screen angle is the ratio of the distance between alternate engraved rows to the wavelength of the stylus cutting motion. The cutting wavelength is a function of the surface speed of the printing cylinder 10 and the oscillation frequency of the stylus. Thus, the screen angle may be adjusted by adjusting the rotational speed of drive motor 12, but such adjustment must be made in incremental steps so as to maintain an odd number of half wavelengths around the circumference of the printing cylinder. Alternatively, the screen angle may be adjusted by adjusting the distance between vertical rows by changing the operating speed of leadscrew motor 14.

The stylus driving signals and the resulting vertical movement of the stylus tip are illustrated in FIG. 3. The driving signal is obtained by adding an AC signal 80 to a video signal 82. The illustrated video signal 82 has, by way of example, a white video level 86, a black video level 88 and a highlight video level 90. The video signal and the AC signal are combined with an offset such that the stylus is raised out of contact with the cylinder surface during the entire time that video signal 82 has a white level 86. The minimum white elevation is WD.

When video signal 82 goes from a white level to a black level, the stylus moves into engraving contact with the cylinder as shown by stylus position line 84. In this condition the stylus oscillates between a minimum depth CD and a maximum depth BD. When the stylus is at the depth CD, it engraves a connecting channel 72. When video signal 82 shifts to a highlight level as indicated by the reference numeral 90, the stylus oscillates between a position out of engraving contact with cylinder 10 to an engraving position having a maximum depth HD. AC signal 80, video signal 82 and a white offset signal are produced by computer 34.

In the illustrated embodiment computer 34 generates an engraving width command W for stylus driver 31 according to the equation:

$$W = (Ka * A * (\mathrm{Sin}(\omega * t) - 1) - WD + Kd * V)/Ks$$

where:

Ka=AC gain

A=maximum value of AC input signal

ω=angular frequency of AC input signal t=time

V=video signal value

Kd=video gain

WD=white depth

Ks=stylus constant

The values of A and ω are stored in computer 34 and ordinarily do not change. Ks is an adjustable input parameter and is entered via keyboard 32.

The video gain is obtained by solving the equation:

$$Kd=Ks*(BW-HW)/(Vmax-Vh)$$

where BW and Vmax are input parameters from keyboard 32. Vh is determined by examining the video signal as hereinafter described, and HW is read from a memory as a tabulated function of Vh.

The white depth is found from the equation:

$$WD=Kd*Vmax-Ks*BW$$

and the AC gain is calculated from:

$$Ka=-A(Ks*CW+WD-Kd*Vmax)/A$$

When Sin (ω*t)=1 and V=Vh, the width command causes the stylus to engrave the widest part of a highlight cell. Therefore in an ideal, error free, case $$HW=(-WD+Kd*Vh)/Ks$$

However, in general there is an engraving error E, so that the measured width of a highlight cell is:

$$HM=(-WD+Kd*Vh)/Ks-E$$

Computer 34 compensates for this error by using a correction parameter C in the calculation of the engraving width command. This correction parameter is generated by a closed loop feedback control technique involving video processor 41 and camera 46.

Prior to the commencement of engraving, C is set to an initial value of zero. During engraving computer 34 causes video processor 41 to provide a series of values of HM for a series of cells which are engraved at times when V=Vh. For each such measurement, computer 34 calculates the width error from the equation:

$$E=(-WD+Kd*Vh)/Ks-HM$$

The correction term then is generated by summing a series of errors as the correction progresses. A gain term G is also employed, so that $$C=\Sigma(G*E)$$

In the most simple embodiment the computed value of C is merely added to the engraving width command. Thus the adjusted engraving width command takes the form:

$$W=(Ka*A*(Sin(\omega*t)-1)-WD+Kd*V)/Ks+C$$

Adjustment of the value of C proceeds only in response to measurements of cells which were engraved when V had a value of Vh. However, the calculation of W always includes a contribution from the most recently calculated value of C. Irrespective of the manner of use of the correction parameter C, its value grows from an initial setting of zero to a magnitude which will substantially eliminate any error in the width of an engraved highlight cell and substantially reduce engraving width errors in cells of other types. For all closed loop embodiments, G is set to a value which provides tight but stable control. A value near 1.0 should be satisfactory in most cases.

Referring now to FIG. 5, the maximum cell depth is seen to be directly proportional to the video input signal. As illustrated in the figure, a maximum 10 volt video input signal produces the maximum cell depth BD required for engraving a black cell. For the illustrated example, computer 34 has been given a highlight width HW=0.25*BW. Hence the highlight depth HD is 25% of BD. The Figure also reflects a setting of 3 volts for Kh. Under those conditions a video signal having an amplitude equal to 30% of a "black" video signal produces a cut having a depth which is only 25% of the black cell depth. As a result the maximum cell depth goes to zero for a video input of about 0.7 volts. For video signals smaller than that amount, the cutting stylus remains out of contact with the printing cylinder. For a "white" video input the stylus is retracted from the engraving cylinder by a minimum distance WD, which is the white offset.

It is important that camera 46 be adjusted for viewing a precisely determined position of track 30. It is to be noted that an individual cell is strobed while the engraver is engraving. For this purpose, the stylus is activated to engrave a test track at one end of cylinder 10. Video camera 46 is strobed to produce a sequence of images which are analyzed by video processor 41. Meanwhile computer 34 counts the camera strobes as a measure of the displacement between the engraving position of the stylus and the field of view of camera 46. When video processor 41 recognizes the test track, it signals computer 34 to save the strobe count. The computer uses this count to control the timing of strobes on line 55 for imaging specific cells known to have been engraved at particular points in time.

Figure 4A:
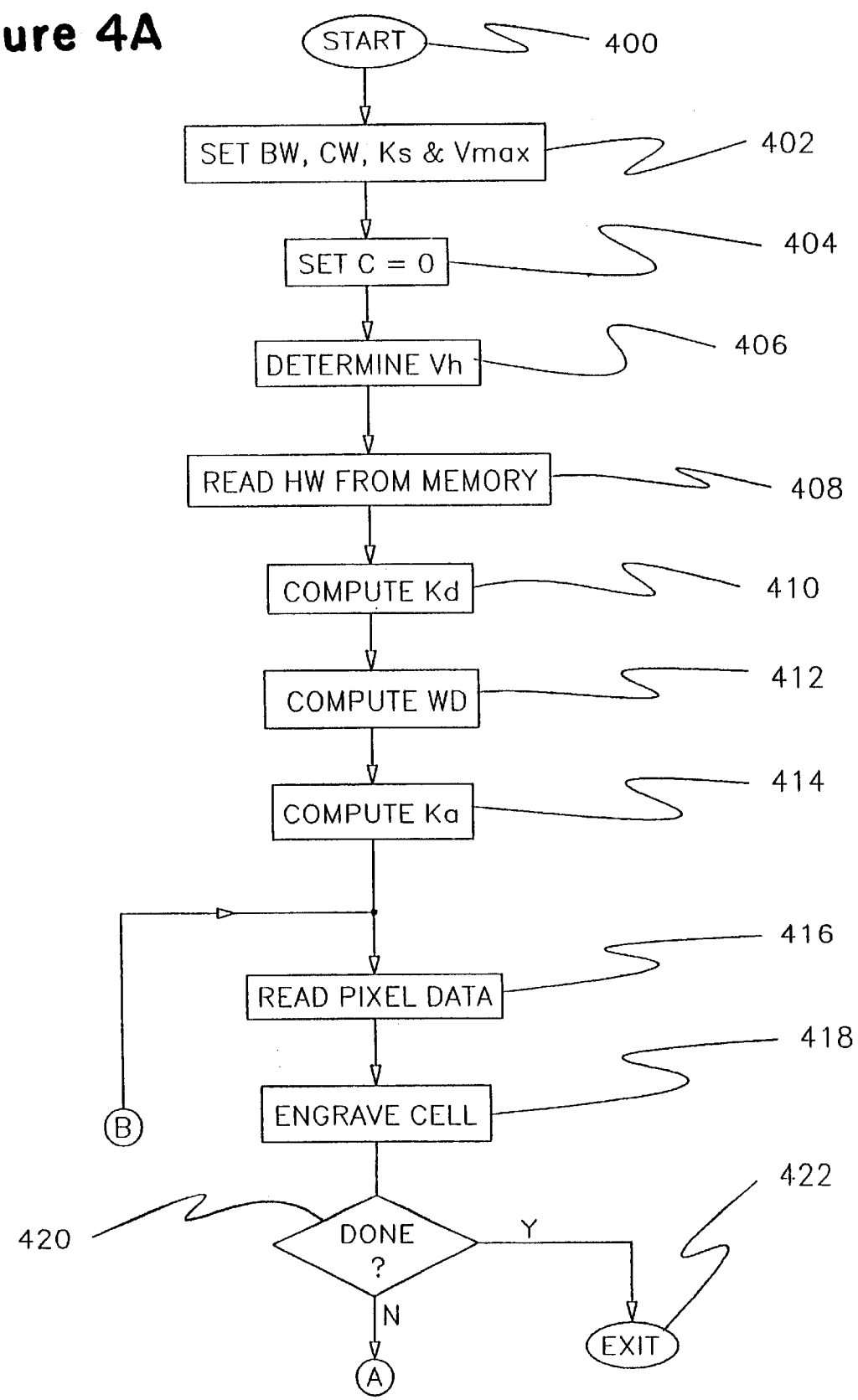
FIGS. 4A and 4B are a flow chart illustrating the method of cell width control and broken stylus detection in accordance with the invention.
Figure 4B:
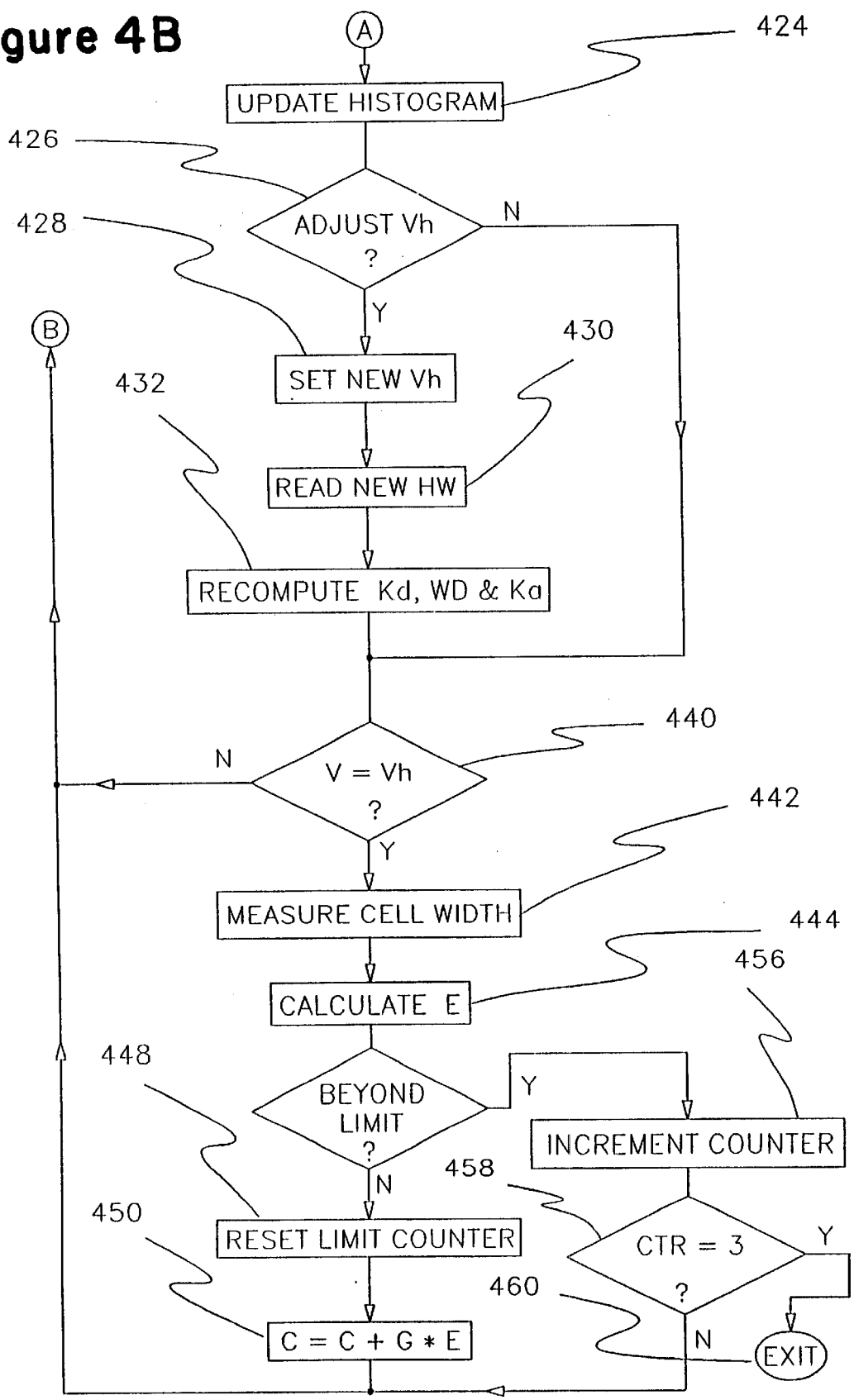

FIGS. 4A and 4B illustrate the above-described method of controlled engraving and error correction. The method begins at a start point 400 and proceeds to block 402 where black width BW, channel width CW, stylus constant Ks, and the maximum video signal Vmax are input to computer 34 via keyboard 32. The correction parameter C, is initialized to a value of zero (block 404), after which computer 34 processes an initial block of video data to determine the most frequently occurring value of video voltage. The value is set equal to Vh (block 406). This value of Vh is used as an address for reading a desired value of HW from memory (block 408). Next, computer 34 computes Kd (block 410, WD (block 412) and Ka (block 414). Although not illustrated in FIGS. 4A and 4B, computer 34 may at this time generate commands for engraving a test track for establishing a strobe timing count, as discussed above. Engraving of printing cells may then commence.

It will be appreciated that the video signal is digitized, so that it always occurs at one or another of a series of discrete levels. The computer samples the video signal and creates a video signal histogram by counting the number of signals of each digitized signal level. The highlighted signal, Vh is deemed to be that video voltage level having the highest number of occurrences.

During normal engraving computer 34 reads pixel data (block 416) and generates engraving width commands for cell engraving (block 418). As each cell is engraved, computer 34 checks for job completion (point 420) and exits (point 422) if the printing job is done. If the printing job is not done, then the video histogram is updated (block 424) and a check is made to see whether Vh should be adjusted (point 426). If so, an appropriate adjustment is made (block 428), and a new value of HW is read from memory (block 430). Then the computer recalculates Kd, WD and Ka (block 432).

Next, a check is made (point 440) to determine whether the current pixel is a highlight pixel. If the current pixel is a highlight pixel, then a cell width measurement is made (block 442) and the width error is calculated (block 444). Otherwise the program returns to block 416 where another pixel value is read.

The measured error is used at block 450 for updating the correction parameter, but only if the error is within a predetermined limit. A check is made for a "Beyond Limit" condition at point 446. If the maximum allowable error is exceeded, then a limit counter is incremented (block 456), and a check is made to determine whether the limit has been exceeded for three consecutive measurements (point 458). If so, then the program exits at point 460, and engraving is terminated. An appropriate alarm may be activated at this time to advise an operator that the stylus should be checked for damage.

In general, an integration function should be employed for defining C, so that the parameter will approach a non-zero steady state value. However, the integrated correction parameter may be used in a variety of ways for adjusting the cell width command. For example, it may be used as a multiplication factor for the cell width command, rather than as an additive term. Also, it may be used as a multiplier or as an offset for any of the variables employed in the calculation of the cell width command. The preferred use depends upon the nature of the error being corrected. In a system where the error varies with the magnitude of the video signal the computed value of C may be added to Kd; provided, however, that WD and Ka are recalculated each time C is adjusted. In another embodiment where there is a drift in the home position of the stylus, C may be added to WD; Ka being thereafter recalculated. So long as the correction variable is used with a polarity which drives the value of the cell width command in the proper direction, correction will continue until E goes to zero.

The value of BW then is used in the computation of the engraving parameters. Keyboard 32 may also provide computer 34 with an adjustment parameter, S, related to the separation distance between engraving head 61 and printing cylinder 10. If this parameter is provided, it is treated as a depth offset which is multiplied by Ks and added to BW, CW and HW prior to performing the above outlined solution.

As stated above, the error correction system comprising the computer 34 calculates the error value E for cells which have been engraved in response to a video signal V having a value equal to Vh. In the embodiment described above computer 34 adjusts Vh from time to time for correspondence with the value of V having the highest cumulative running count. It is also feasible to restart the count from time to time, so that the highlight setting algorithm becomes localized in nature. This may be desirable for a very large graphic reproduction. As described above, a predetermined value of HW is associated with each digitized value of Vh. HW may be read from a stored table or calculated from an appropriately written empirical equation.

The computer 34 may signal an "out of limit" condition upon detection of a cell width error in excess of any predetermined amount. In a typical application of the invention a suitable maximum allowable error may be in the order of about 10 microns. If that limit is exceeded more than a prescribed number of times, then engraving is terminated, as stated above. At this point an operator checks the stylus, replaces it if necessary, and wipes the printing cylinder to clean off any diamond chips which have accumulated. Next, the operator initiates a new test cut sequence. Then the engraver returns to the revolution prior to the revolution in which the "Beyond Limit" condition was first detected. The affected revolutions are recut, and the engraver is halted for operator examination of the result. If the recut rows are acceptable, then the operation is continued. Otherwise the printing cylinder is scrapped.

FIG. 6 illustrates a typical frame of video information 600 including a highlight cell 606 which was engraved PC clock counts prior generation of the strobe which produced the frame 600. Frame 600 comprises a series of horizontal lines which are too numerous for illustration. Representative horizontal video lines are indicated by the reference numerals 602. These lines are a subsampling of the cell image captured by the strobe. The actual cell size dimensions are measured from these lines.

Video processor 41 processes lines 602 sequentially from top to bottom. The video information is enhanced through a localized thresholding technique. This technique involves a division of the image into small rectangular regions. The video data for each region is examined, and the brightest and dimmest pixels are identified for each region. Then a black/white threshold is set at the mid-brightness level between the brightest and dimmest pixels. Those pixels within the region which are lighter than the threshold are deemed to be white, whereas pixels which are darker than the threshold are deemed to be black. All rectangular regions are examined, and all pixels have their brightness adjusted to black or white, depending upon the raw brightness level relative to the localized threshold.

Each line of enhanced video information is examined for the presence of black/white and white/black transitions. FIG. 6 illustrates black/white transitions by symbols denoted by the reference numeral 610, whereas white/black transitions are denoted by symbols indicated by the reference numeral 611. This establishes a series of boundary lines as illustrated in FIG. 6 by reference numerals 604, 605, 606, 607, 608 and 609. These boundary lines define a white region 650.

Video processor 41 recognizes the white region 650 by a black/white transition 610 followed by a white/black transition 611. For each such transition pair, video processor 41 establishes a first linked list. If the programming is performed in the C language, for example, then such a linked list may be represented by an entity known as a structure. Each such linked list includes the X coordinates of the left and right boundaries of the white region indicated by the transition pair. The linked lists for each scan line 602 are associated with the linked lists of the preceding scan line by comparison of the boundary points.

For the first six video lines 602 of FIG. 6, only one white span (and one linked list) appears. However, on the seventh horizontal line, denoted by the reference numeral 602*a*, two additional transition points 611*d*, 610*d* appear. These two new transition points mark the boundaries of highlight cell 606. It can be seen that the appearance of highlight cell 606 causes a "split" in the white region 650. Video processor 41 reacts to this split by establishing a second and third linked lists to replace the first linked list previously being processed.

Once a split is observed, the video processor knows that highlight cell 606 is present The video processor then compares the left boundary of the third linked list with the right boundary of the second linked list to determine the width of the highlight cell 606. The highlight width is calculated for each scan line 602 and compared with the highlight width calculated for the preceding scan line. Each time a comparison is made, video processor 41 saves the larger value. The process continues until the intermediate black region disappears (at 602*b*) and the two legs of white region 650 merge. At this point the measurement ceases and the processor saves the observed maximum value of HW as HM. Video processor 41 passes this value of HM to computer 34. The computer 34 associates the reported value of HM with the specific engraving command, which was sent to the stylus PC clock counts earlier than the strobe which produced the video frame.

Figure 7:
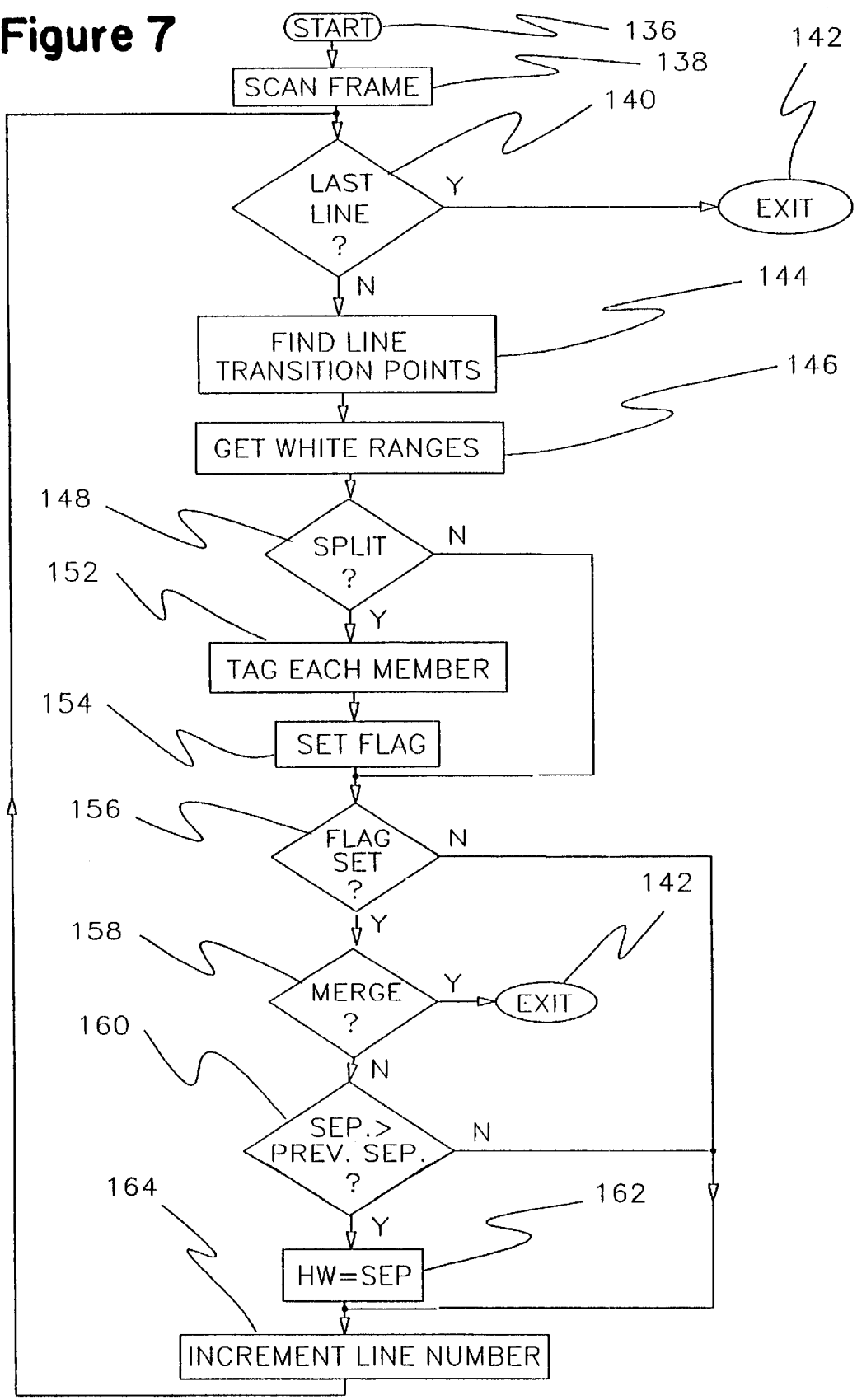
FIG. 7 is a flow chart of a cell width measuring algorithm.

FIG. 7 illustrates the above outlined measuring process in flow chart form. Thus, HW measurement begins at a start point 136 and proceeds to a scanning step at block 138. As discussed above, frame grabbing or scanning is initiated by a strobe signal on line 55.

Once a frame has been scanned the video processor checks the line number at point 140. If the bottom of the frame has been reached, then there is an exit at point 142. Assuming that the frame bottom has not been reached, the program proceeds to block 144 where it establishes transition points 610, 611. Then the program obtains the white ranges at block 146 for use in the above-described linked lists. Next the program looks for a split at point 148. If a split is noted, then the two resulting linked lists are tagged at block 152 and a flag is set at block 154.

The program checks the state of the flag at point 156 and jumps down to block 164 for a negative result. This means that the top of highlight cell 606 has not yet been reached and there is no need to measure a cell width. Consequently, the program simply increments the line number at block 164 and returns back to point 140.

If the check at point 156 indicates that the flag has been set, then the program checks for a merge at point 158. If a merge is noted, then the program exits from the measurement routine. If a merge has not yet occurred, then the program checks the separation distance between the two legs of the white region 650. This distance is compared at point 160 against previously saved separation distances. If the new separation distance is greater than any previously saved distance, then HW is set equal to that distance. Referring again to FIG. 6, the first separation distance is the distance between points 611*d* and 610*d*. This distance keeps increasing until the program reaches points 611*a* and 610*a*. At that point the separation distance is maximum, and no further adjustments of HW are made.

The video processor 41 then feeds the measured value of HW back to computer 34 for closed loop cell width control.

Figure 8A:
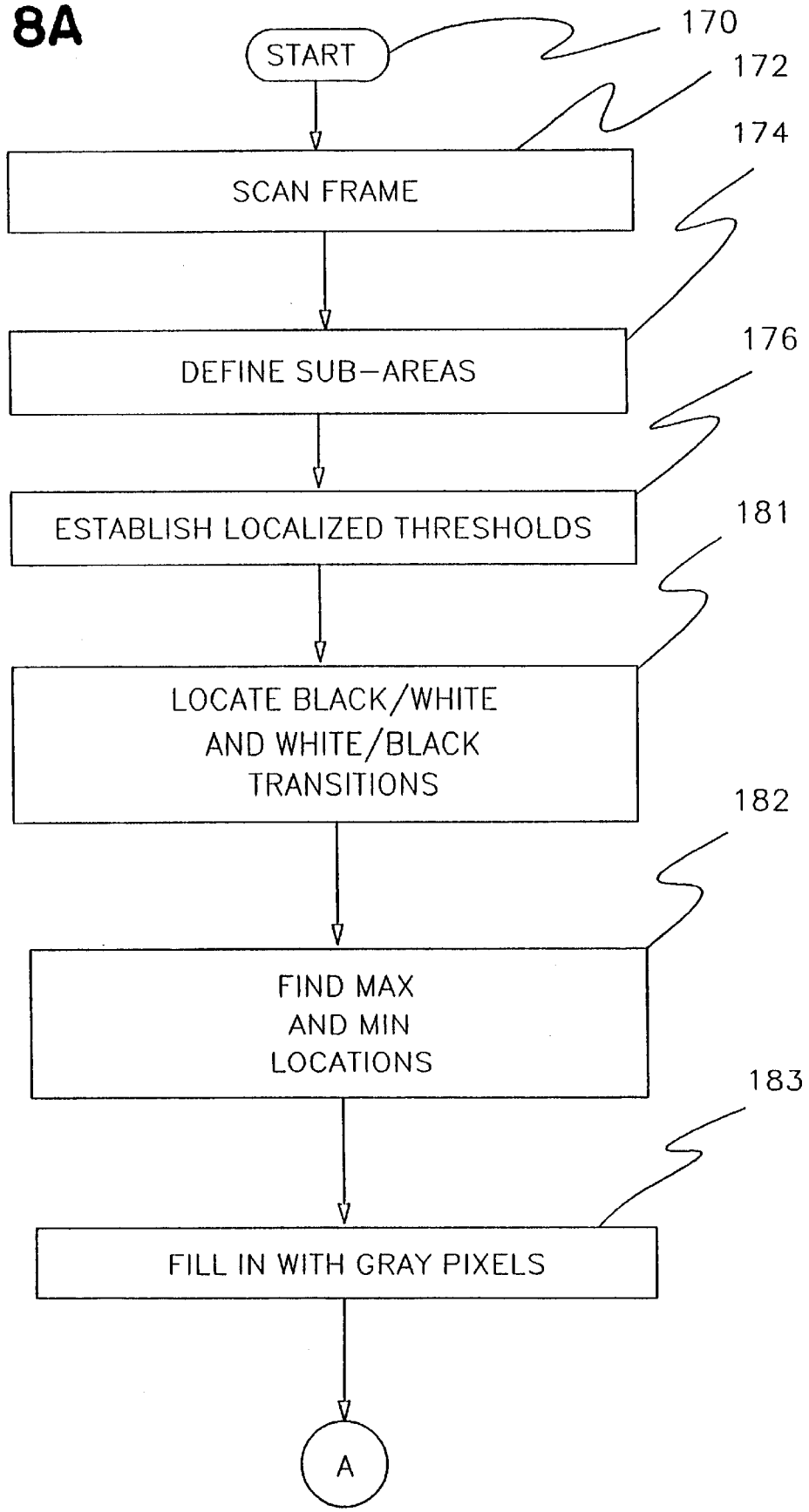
FIGS. 8A and 8B, taken together, show a flow chart of another measuring algorithm.
Figure 8B:
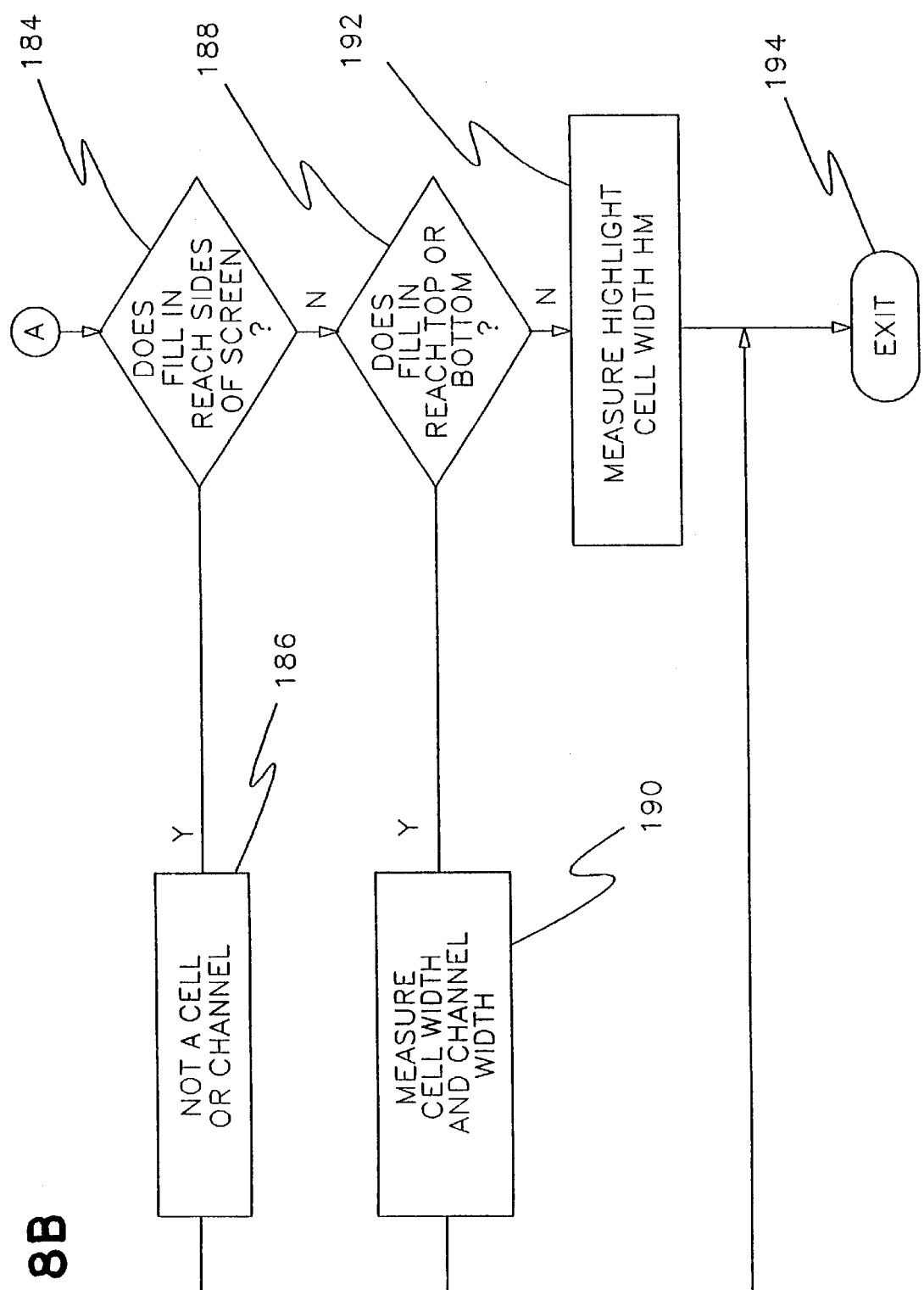
Figure 9:
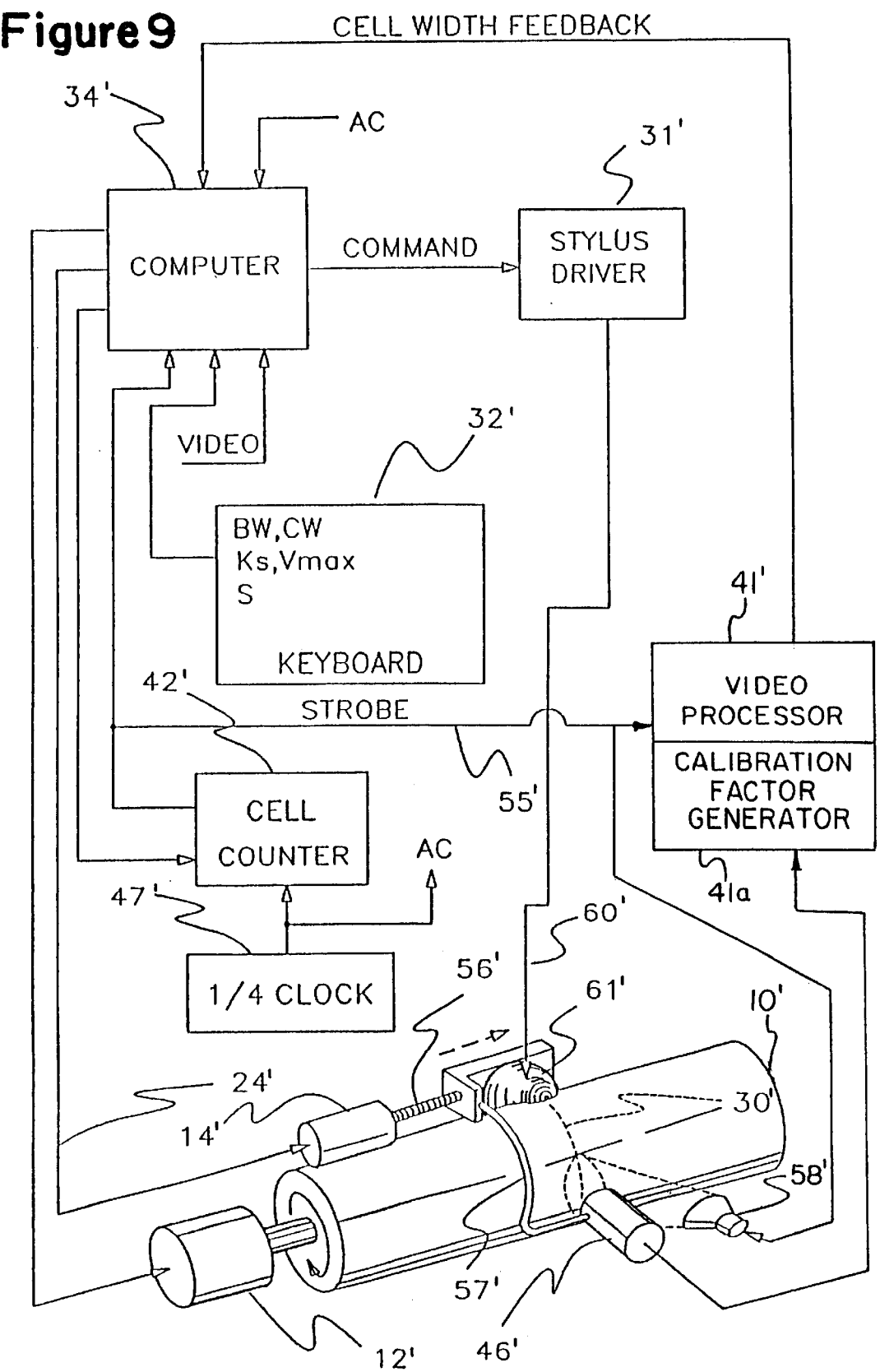
FIG. 9 is an illustration of another embodiment of the invention which incorporates an improved system and method for calibrating an imager to provide improved measurements of engraved areas as illustrated in FIGS. 10–15.
Figure 10:
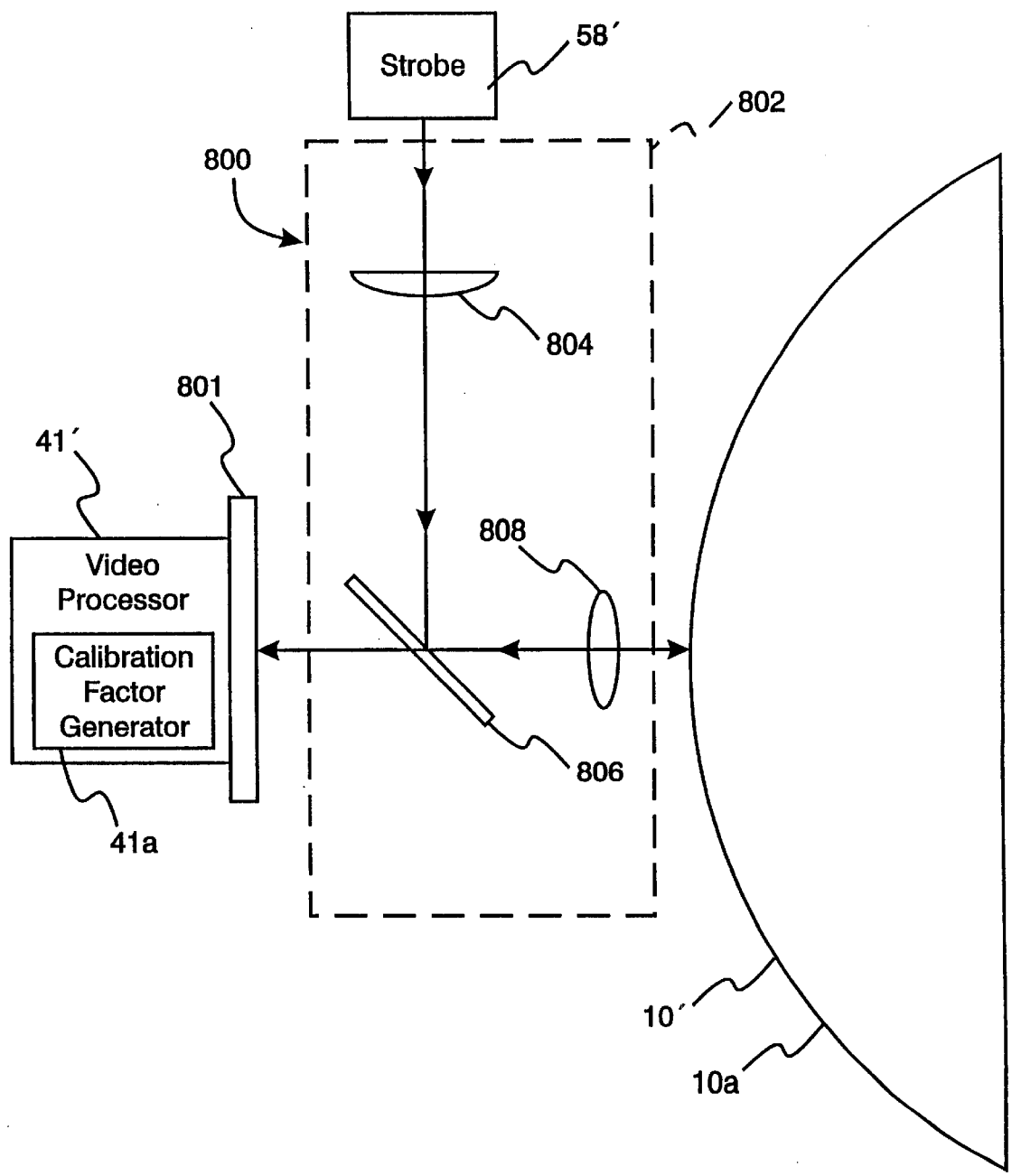
FIG. 10 is an illustration of a prior art optical arrangement used in combination with one embodiment of the invention.

FIGS. 8A and 8B show another embodiment of the invention wherein cell width, channel width, and error value E are measured. In this embodiment, video processor 41 determines the existence of the white region 650 by the black/white transition 610 followed by a white/black transition 611. The cell which was actually measured and strobed is assumed to be generally located in the center of the scan frame 600.

After all the boundary transition points have been determined, the maximum and minimum distances between transition points which lie on the same horizontal scan line 602 are determined. These values are conventionally subtracted by video processor 41, thereby resulting in values associated with the distance between the walls of highlight cell 606. Video processor 41 then scales these values to the pixel sizes of video camera 46 (FIG. 1).

It is to be noted that the minimum distance determined by video processor 41 corresponds to the channel width. If the video processor 41 determines that the minimum distance is below zero, then there is no channel and the observed cell now may be assumed to be a highlight cell. As with the maximum distance, the minimum distance between black/white and white/black transitions which lie on the same line 602 are scaled to the magnification and pixel sizes of video camera 46 (FIG. 1).

Referring now to FIG. 8A, the measuring process begins at start block 170 and proceeds to scan a frame of data at block 172. After the frame of data has been captured, the data is broken down into a plurality of localized sub-areas at block 174. By using these smaller localized sub-areas, video processor 41 and computer 34 are able to process data faster. This is similar to the measuring process described above with respect to FIG. 7. Threshold levels are determined for each localized sub-area (block 176), and localized thresholding is performed to locate all black/white and white/black transitions (block 181). Then the maximum and minimum transition points on each scan line are identified by video processor 41 at block 182. These maximum and minimum transition points are assumed to coincide with the side boundaries of the cell. At block 183 the portions of memory which store the video data covering the area between the maximum and minimum transitions for each line are filled in with gray pixels.

At point 184, the video processor 41 checks to determine if the memory fill in has reached the sides 625 and 627 (FIG. 6). If it has reached sides 625 and 627, then video processor 41 determines that no cell or channel is being measured (block 186). If it has not reached sides 625 and 627, then video processor 41 determines if the fill in has reached top 621 or bottom 623 at point 188. If the top 621 or bottom 623 has been reached, video processor 41 calculates the channel width and cell width at block 190 using the maximum and minimum values determined at block 182. If the top 621 or bottom 623 has not been reached, then video processor determines the measured highlight cell width HM at block 192. After all the measurements have been determined, video processor exits at point 194, whereupon an error value E is determined by computer 34 in the manner described earlier herein.

It is to be noted that this system may be used during initial setup or during the normal operation of the gravure engraver. Thus, the system and method described herein can provide "real time" display of the actual measurement and "real time" correction for any error value E.

It should be appreciated that the cell measuring method of this invention could measure cell dimensions while printing cylinder 10 were being held stationary (i.e., not revolving during). It should also be noted that the system and method for measuring may provide cell dimensions on an open loop basis. Measurements, so obtained, could be displayed to a human operator, who could then enter manual adjustments of an appropriate correction parameter.

Referring now to FIGS. 9–15, another embodiment of the invention is shown. This embodiment includes an image system and method for improving the accuracy of the measurements obtained. The system and method provides means for calibrating an imager or image system on the engraver by imaging engraved areas, generating a pixel representation of the engraved areas, and processing such representation to generate a calibration factor for use when determining actual measurements of engraved areas subsequently imaged by the imager.

It should be appreciated that like parts are identified with the same part number, with the exception that a prime mark ("'") has been added to the embodiment described in FIGS. 9–15.

In this embodiment, the camera or imager 46' comprises an imager, image means, or an image system 800 (FIG. 10) and a CCD array 801 which may be situated along with strobe 58' in a common housing (not shown). In the embodiment being described, the imager 800 comprises optics 802 comprising a collimating lens 804 which colliminates strobe light from strobe 58' onto a 50-50 beam splitter 806 which directs strobe light through objective lens 808 and onto cylinder 10. The reflected light is directed through lens 808 and beam splitter 806 and captured by the CCD array 801. Imager 46' creates rastered video frames which are selectively read by a frame grabber (not shown) and stored in suitable memory (not shown) of processor 41'.

Figure 11:
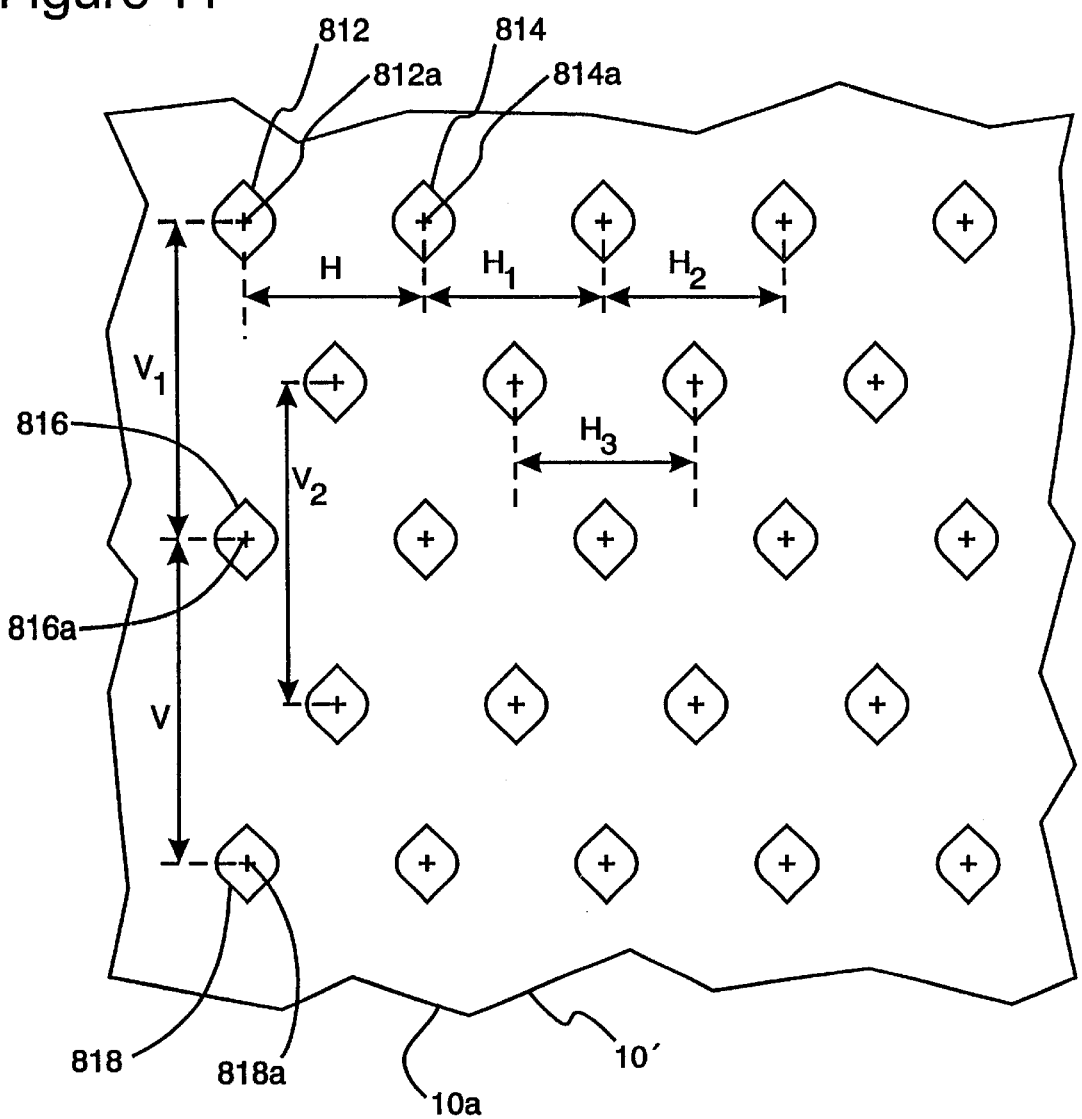
FIG. 11 is a fragmentary view of a portion of a cylinder illustrating a screen comprising a plurality of engraved areas and illustrating various horizontal distances H–H3 and vertical distances V, V2 and V3.

FIG. 11 illustrates a fragmentary view illustrating a plurality of engraved areas 812, 814, 816 and 818 engraved into surface 10a of cylinder 10' by engraving head 61'. While optics 802 may be focused manually for high resolution imaging of the surface 10a of cylinder 10', it is preferable that camera 46' include an auto focus unit and error tolerant methods and systems for measuring features of engraved areas as taught in U.S. Pat. Nos. 5,610,063; 5,737,090, 5,438,422; and 5,440,398 and Ser. No. 08/476,093 all of which are assigned to the same Assignee as the present invention and which are incorporated herein by reference and made a part hereof.

Figure 12:
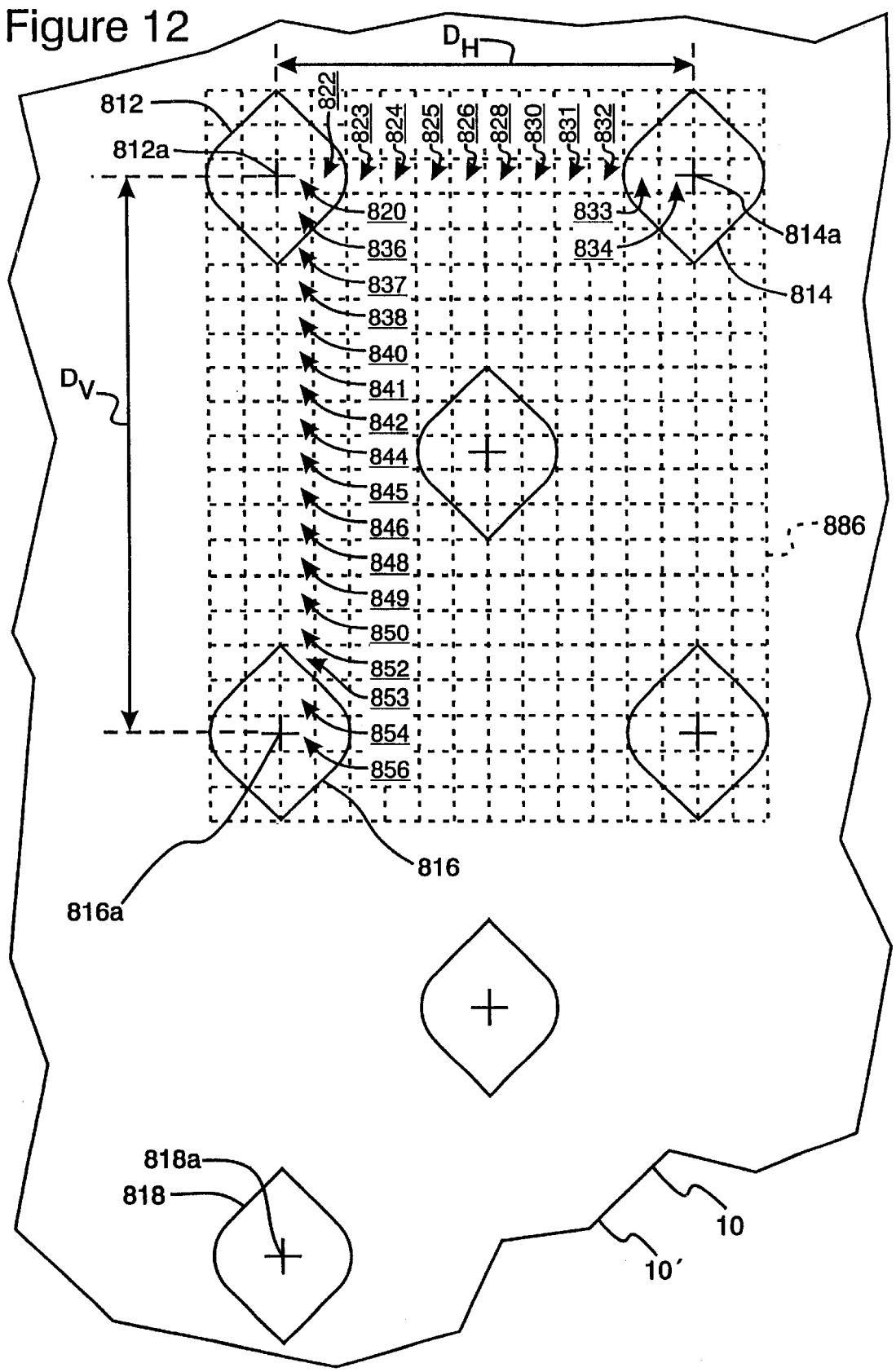
FIG. 12 is an enlarged fragmentary view of a portion of a cylinder showing a pixel array representation of a plurality of engraved areas on the cylinder.

FIG. 12 illustrates a pixel representation generated by CCD 801 of camera 46'. For purposes of illustration, each pixel is represented by a box, such as boxes 820, 822, 823, 824, 825, 826, 828, 830, 831, 832, 833, 834, 836, 837, 838, 840, 841, 842, 844, 845, 846, 848, 849, 850, 852, 853, 854 and 856 represent a separate, individual pixel in the CCD array 801.

The system and method described herein provides means for accurately calibrating the imager 46' so that improved measurements of areas subsequently imaged may be achieved. The means, system and method for performing such imaging and measurement will now be described.

Figure 13:
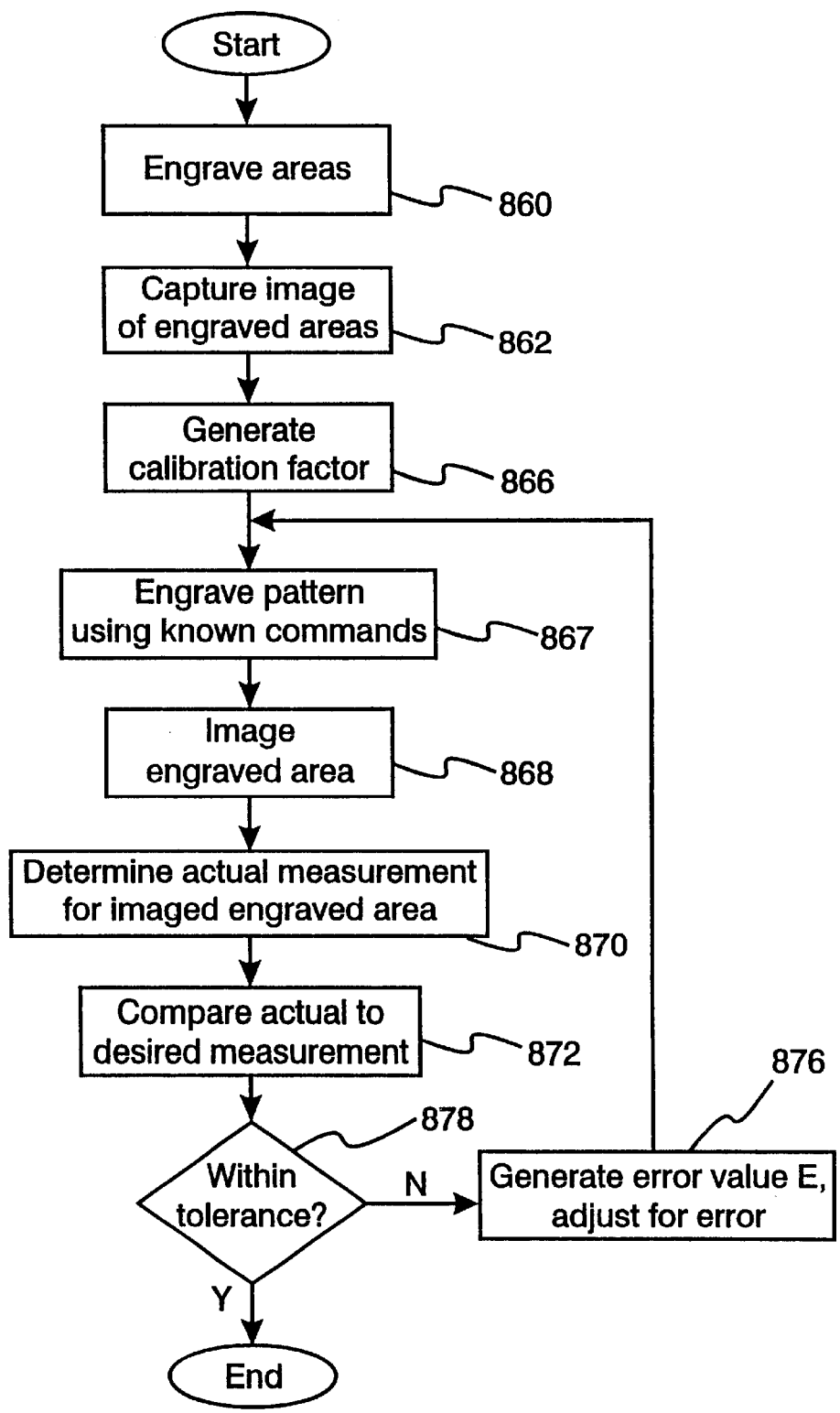
FIG. 13 is a schematic view illustrating an improved engraving and imaging system and method according to one embodiment of the invention.

As illustrated in FIG. 13, the procedure begins where a plurality of engraved areas, such as areas 812–818 in FIG. 11 are engraved by engraving head 61' (block 860 in FIG. 13) in the manner previously described. At block 862, imager 800 captures an image of the engraved areas. Processor 41' comprises a calibration factor generator 41a (FIG. 10) which generates a calibration factor (block 866) which will be used for obtaining subsequent actual measurements of the imaged engraved areas. The method and procedure used by processor 41' and calibration factor generator 41a for generating the calibration factor will be described later herein relative to FIG. 14.

In general, the calibration factor represents a ratio defined by the following Equation 1:

$$M_i = D_i / P_i$$

where $M_1$ is the calibration factor.

$P_i$ comprises a count of a number of pixels between a first point on a first engraved area, such as engraved area 812 in FIG. 11, and a second point on a second engraved area, such as either engraved area 814 or 816. It should be noted that a relationship between said first point relative to said first engraved area substantially corresponds to a second relationship of said second point to said second engraved area.

The variable $D_i$ comprises a distance between said first engraved area and said second engraved area as defined by a desired screen which is selected by a user. In general, the selected screen defines a population of engraved areas (for example, the number of rows of engraved areas) per square centimeter. The user typically selects the size of the engraved area, as well as a screen angle to define the desired screen. Based on this known input information, the distance $D_i$ can be mathematically calculated according to conventional means known to those skilled in the art.

The subscript variable i is a direction, such as a preselected horizontal, vertical or diagonal direction.

Once the calibration factor is known, then an actual value for each pixel in terms of a micron distance may be calculated. In this regard, this calibration factor may be applied to a pixel span comprising a count of the number of pixels to provide an actual distance in microns for that pixel span. In the embodiment being described, a desired pixel span may include a count of the number of pixels between transition points, such as points 610a and 611a illustrated in FIG. 6, or centroids of a pair of engraved areas, such as engraved area pair 812 and 814 in a horizontal direction or engraved area pair 812 and 816 in the vertical direction (as viewed in FIG. 12). Moreover, once a pixel/micron representation or calibration factor is obtained, it can be applied to pixel spans which represent or correspond to, for example, a width or height of a cell, or even a diagonal spacing between engraved areas, such as engraved area pair 814 and 816. For example, once a diagonal spacing is obtained, a processor 41' can determine the actual screen angle for the engraved areas which may be useful to confirm that the engraved areas are being engraved in accordance with the selected or desired screen.

The procedure continues to block 867 in FIG. 13 where computer 34' energizes stylus driver 31' to cause engraving head 61' to engrave a desired pattern of engraved areas. At block 868, processor 41' causes imager 800 to capture an image of a plurality of engraved areas for purposes of error correction which begins at block 870 by determining an actual measurement for one or more of the engraved areas imaged at block 868 by calibration factor generator 41a using the calibration factor determined at block 866.

In the manner taught and described earlier herein, as well as in the aforementioned U.S. patents which are issued to the same Assignee as the present invention, the actual measurement obtained can be compared to a desired or commanded measurement (block 872). If the actual measurement is not within a desired or acceptable tolerance (block 878), then computer 34' and video processor 41' can account or adjust for the error (block 876), for example, by altering the engraving command signal. After the error is adjusted for, the process loops back to block 867 as shown. If the decision at decision block 878 is yes, the procedure ends. This procedure may be performed during real-time operation, and it may be performed during a test cut or while engraving a printing job.

The method or procedure for generating the calibration factor as referred to at block 866 will now be described relative to FIG. 14, wherein the method begins at block 884 by video processor 41' using the image of engraved areas captured at block 862 (FIG. 13) to generate the pixel array 886 (FIG. 12) corresponding thereto.

FIG. 12 illustrates an enlarged view of several of those engraved areas, such as engraved areas 812, 814, 816 and 818 (shown in FIG. 11), illustrating the pixel array 886 generated by CCD 801 (FIG. 10) as stored in processor 41'. In this regard, the various features and teachings (such as system timing, strobe trigger logic, the frame grabber, image processing routines, and the like), as shown and described in the aforementioned U.S. patents, particularly U.S. Pat. No. 5,671,063, may be utilized to facilitate generating the digital pixel array 886 (FIG. 12).

Once the pixel array 886 is generated at block 884 and stored by processor 41', the routine proceeds to block 888 where processor 41' locates centroids for each of the engraved areas. The centroids for engraved areas 812, 814, 816 and 818 are identified for ease of illustration in FIG. 12 by the cross hairs or centroids 812a, 814a, 816a and 818a, respectively.

Centroids 812a–818a for the plurality of engraved areas 812–818, respectively, shown in FIG. 12 are determined by first locating the transition points, such as points 611a and 610a of FIG. 6, using the method of FIG. 7. The maximum white/black to black/white transition points or pixels for each engraved area are recorded by video processor 41. Thus, for each engraved area, a white/black transition pixel corresponding to the left edge of a particular engraved area, denoted $x_1$, and a black/white transition pixel corresponding to the right edge of same engraved area, denoted $x_2$, are identified. The centroid pixel location for the engraved area is determined by video processor 41 as the pixel halfway between edge or transition pixels $x_1$ and $x_2$; Thus, a centroid pixel location is defined by the following Equation 2:

$$y = \left(\frac{x_2 - x_1}{2}\right) + x_1$$

The centroid pixel location of each engraved area within the video frame of data as illustrated by FIG. 12 are determined in a like manner.

Figure 14:
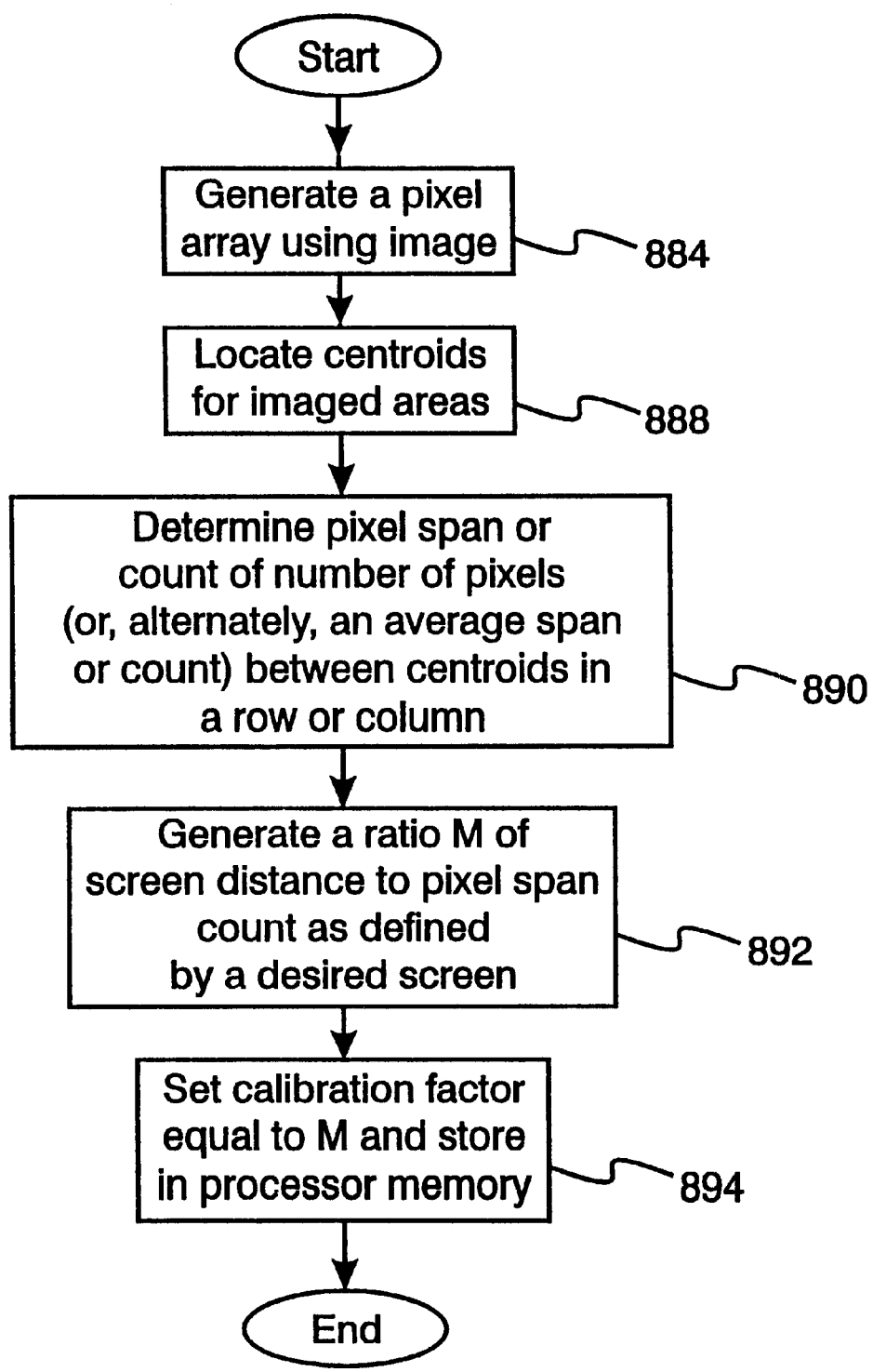
FIG. 14 is a schematic illustration of a routine for determining the calibration factor M utilized in the routine illustrated in FIG. 13.

Once the centroid pixels for each of the plurality of engraved areas is determined, processor 41' performs a pixel scan or count (P) of the cumulative number of pixels situated between centroids for a pair of selected engraved areas (block 890 in FIG. 14). For example, in FIG. 12, processor 41' counts the pixels between, for example, centroid 812a of engraved area 812 and centroid 814a of engraved area 814 and generates a count (12 in the illustration being described) corresponding thereto. It should be appreciated that other pixel scans or counts may be obtained between other engraved areas, such as in a vertical direction (as viewed in FIG. 12) between centroid 812a of engraved area 812 and centroid 816a of engraved area 816. Moreover, the pixel count does not necessarily have to be between adjacent engraved areas, but could be between non-adjacent engraved areas or even areas which have an intermediate engraved area situated therebetween, such as between engraved areas 812 and 818. Furthermore, the pixel count could be between diagonally spaced engraved areas, such as engraved areas 814 and 816.

Once the pixel scan or count is determined at block 890 (FIG. 14), the routine proceeds to block 892 where calibration factor generator 41a of processor 41' generates the calibration factor ratio $M_i$ defined by the aforementioned Equation 1.

Continuing the previous illustration, if the engraver is commanded to engrave the pattern of FIG. 12 using a screen angle of 45° and a screen width of 70 lines/cm, then the distance $D_H$ between centroids 812a and 814a is known to be 202 microns on the surface 10a of cylinder 10. Substituting the aforementioned pixel count $P_H$ between centroids 812a and 814a, and the distance between centroids 812a and 814a $D_H$ into Equation 1 gives the measured calibration factor for the horizontal direction (i.e., $M_H$):

$$D_H / P_H = \frac{202}{12} = 16.8 \text{ microns/pixel}$$

This value of $M_H$ is the horizontal extent in microns on the surface 10a of cylinder 10 which is imaged by a single pixel of CCD array 801. Thus, for the preceding example, one pixel corresponds to a horizontal extent of 16.8 microns. For ease of illustration, FIG. 12 has been shown with a minimum number of pixels. During typical applications, a much higher pixel density is used and the actual values of $M_H$ are closer to one.

Similarly, a calculation of $M_V$ is performed in the vertical dimension using the known distance $D_V$ between centroids 812a and 816a on the surface 10a of cylinder 10 and the corresponding pixel count as can be derived from FIG. 12. Calibration factors $M_H$ and $M_V$ are then stored in memory of video processor 41 as shown in block 894 of FIG. 14.

Figure 15:
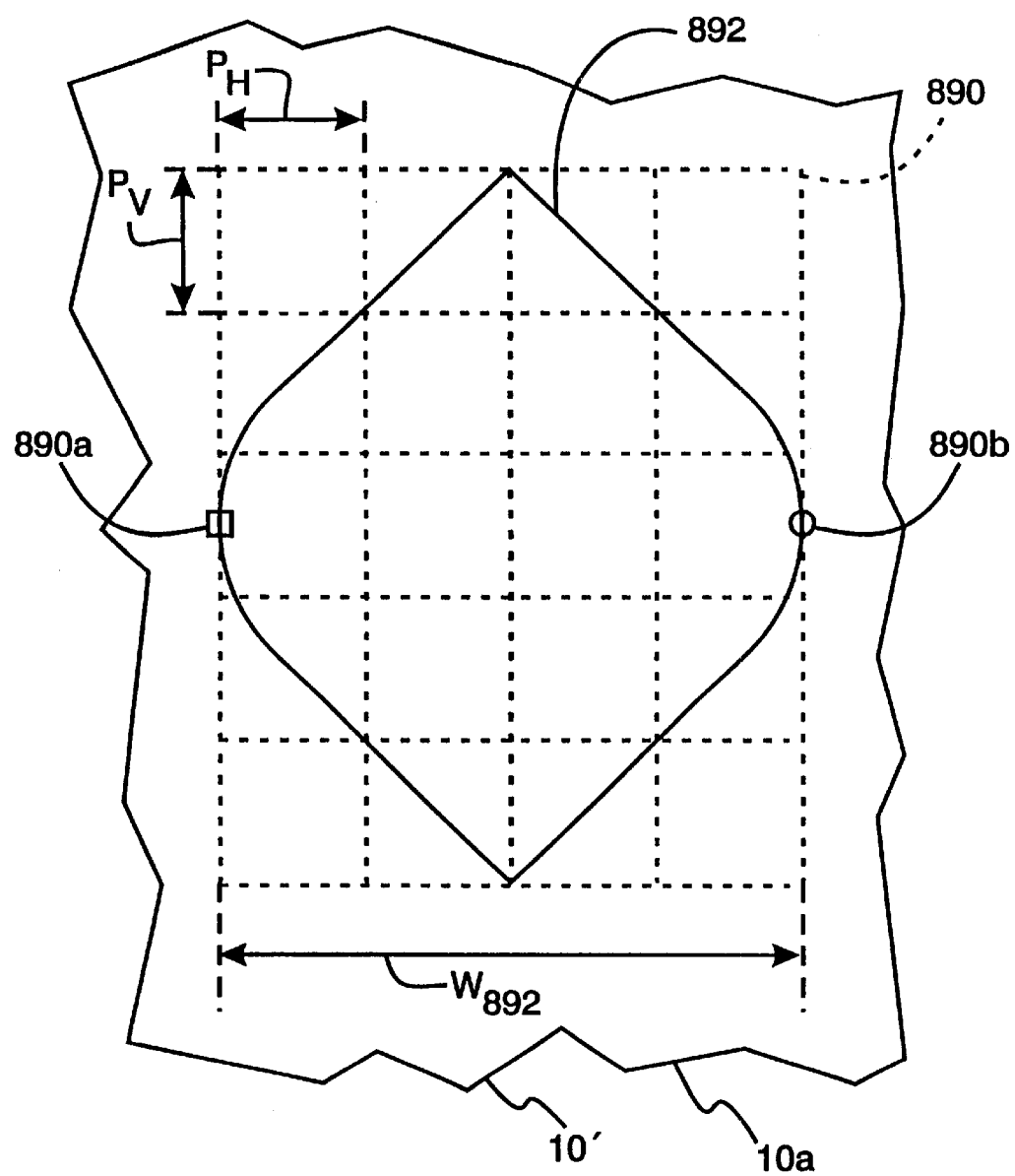
FIG. 15 is a view of a pixel array representation of an engraved area illustrating an application of the invention.

It should be appreciated that processor 41' utilizes the known distance D and the pixel count P to generate the calibration factor M which, in turn, provides a direct correlation between a dimension or size (such as a pixel width PH which corresponds to the horizontal extent of the pixel or pixel height $P_V$ which corresponds to the vertical extent of the pixel as viewed in FIG. 15) of a pixel and the actual distance, in microns, corresponding to such pixel dimension. It should be appreciated that the dimensions or sizes of the pixel, such as $P_H$ or $P_V$, are dimensions of the pixel at the surface 10a of cylinder 10. Stated another way, the space or area at the surface 10a of cylinder 10 defined by the dimensions $P_H$ and $P_V$ is that which is imaged, viewed or represented by a single pixel of CCD array 886 (FIG. 11) generated by CCD 801 (FIG. 10) and processor 41'.

Once the calibration factor is determined, video processor 41' sets the calibration factor equal to the ratio or distance relationship determined and stores the value in memory (not shown) at block 894 (FIG. 14). Once it is determined what a pixel represents in terms of real units, such as microns, centimeters or inches, the calibration factor can be applied to subsequent pixel spans or counts of engraved areas so that actual measurements using pixel images of an engraved area, such as area 892 in FIG. 15 of the engraved areas may be obtained (block 870 in FIG. 13) by multiplying the pixel span or count by the calibration factor M. Thereafter, subsequent error correction using the actual measurement may be performed in a manner described earlier herein.

By way of illustration, FIG. 15 illustrates a pixel array 890 representation of the engraved area 892 which is engraved on surface 10a of cylinder 10'. If it was desired, for example, to determine an actual width $W_{892}$ for engraved area 892, then processor 41' determines a count of the number of pixels between, for example, transition points 890a and 890b (FIG. 15) using the pixel array 890. In the illustration being described, the processor 41' determines the pixel count of pixels to be equal to four pixels. The calibration factor $M_H$ is then applied to this count (i.e., $M_H \times 4$) to provide the actual measurement of the width $W_{892}$. Thus, in this illustration, the width $W_{892}$ equals 67.2 microns (4×16.8).

As with the embodiments described earlier herein, this system and method provides both "real time" correction for error values and provides an improved system and method for open loop and/or closed loop measurement and adjustment of the engraver during either real time operation or while the cylinder is stationary.

In order to minimize errors that may be caused by the relative position between camera 46' and cylinder 10', it is preferable that the centroid pixel pairs selected for determining the calibration factor be located in approximately the same image column or row within the pixel array 886 (FIG. 12).

In order to further increase the accuracy of the calibration factor, an average pixel span of pixels situated between a plurality of pairs of pixel centroids may be selected. For example, an average of the horizontal pixel spans represented by the horizontal widths H, H1, H2 and H3 (FIG. 11) may be determined, as well as an average of the vertical pixel spans associated with the vertical distances V, V1, and V2. The calibration factor M may then be calculated using the distance D corresponding to the pixel span determined.

It should be appreciated that calibration factor generator 41a of processor 41' may determine a calibration factor M for use in a horizontal direction, as viewed in FIG. 12, which will be useful in generating measurements of widths of the engraved area being measured. Calibration factor generator 41a of processor 41' may also generate a separate calibration factor in the vertical direction (as viewed in FIG. 12) which will be useful in generating a length or height value for the engraved area being measured.

Alternatively, processor 41' may determine a single calibration factor M using an average of calibration factors for both horizontal and vertical pixel spans; providing the CCD 801 (FIG. 10) has pixels with identical sizes in the vertical and horizontal directions.

In order to further improve and compensate for statistical fluxuations that may occur due to noise and inaccuracy in capturing images, it may be desired to capture images of patterns of engraved areas located on various parts of the cylinder 10'. Using the aforementioned alternative approach of using average pixel spans, the calibration factor M may then be determined to a greater statistical accuracy.

Advantageously, this system and method provide means for providing closed-loop calibration of imaging systems using actual engraved areas having spacing or separation characteristics defined by the selected screen. Because of the relatively high accuracy of engraving machines, this system and method provide means for very precisely compensating for variations (such as, for example, the physical distance between the lens 808 in FIG. 10 and the CCD 801 or tolerances in the physical characteristics of the lens 808) and tolerance differences in the particular optics and/or imaging system.

Moreover, the system and method provide means for facilitating reducing or eliminating the need for separate or multiple calibrating instruments and steps. This system and method provide a single calibration which is less prone to human error and can be performed on the order of 3 to 5 times faster than traditional manual techniques with high repeatability. For example, this calibration technique may be performed in less than about one minute after the engraved areas are cut.

Typically, reducing measurement tolerance or determining accuracy in the imaging system over traditional methods have been improved by greater than a factor of two to one.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. An image system for imaging engraved areas on workpieces comprising:

an imager for imaging a plurality of engraved areas on a workpiece and for generating a pixel array corresponding thereto; and a processor coupled to said imager for using said pixel array to generate a calibration factor for use when determining actual measurements for engraved areas subsequently imaged by said imager;

wherein said processor locates at least one pair of said engraved areas using said pixel array and generates said calibration factor corresponding thereto, said processor generating said calibration factor using a scaling variable and a known screen variable associated with said plurality of engraved areas;

wherein said calibration factor comprises a ratio of said scaling variable and said known screen variable;

wherein said known screen variable comprises a distance defined by a desired screen; and wherein said scaling variable comprises a number of pixels between engraved areas.

2. An image system for imaging engraved areas on workpieces comprising:

an imager for imaging a plurality of engraved areas on a workpiece and for generating a pixel array corresponding thereto; and a processor coupled to said imager for using said pixel array to generate a calibration factor for use when determining actual measurements for engraved areas subsequently imaged by said imager;

wherein said processor locates at least one pair of said engraved areas using said pixel array and generates said calibration factor corresponding thereto, said processor generating said calibration factor using a scaling variable; and wherein said scaling variable comprises a count of the number of pixels situated between centroids of said plurality of engraved areas.

3. An image system for imaging engraved areas on workpieces comprising:

an imager for imaging a plurality of engraved areas on a workpiece and for generating a pixel array corresponding thereto; and a processor coupled to said imager for using said pixel array to generate a calibration factor for use when determining actual measurements for engraved areas subsequently imaged by said imager;

wherein said processor locates at least one pair of said engraved areas using said pixel array and generates said calibration factor corresponding thereto, said processor generating said calibration factor using a scaling variable and a known screen variable associated with said plurality of engraved areas;

wherein said calibration factor comprises a ratio of said scaling variable and said known screen variable;

wherein said known screen variable comprises a distance defined by a desired screen; and wherein said at least one scaling variable comprises a count of the number of pixels between centroids of said plurality of engraved areas and said known screen variable comprises an actual distance between said engraved areas as defined by said screen associated with said plurality of engraved areas.

4. An image system for imaging engraved areas on workpieces comprising:

an imager for imaging a plurality of engraved areas on a workpiece and for generating a pixel array corresponding thereto; and a processor coupled to said imager for using said pixel array to generate a calibration factor for use when determining actual measurements for engraved areas subsequently imaged by said imager;

wherein said processor locates at least one pair of said engraved areas using said pixel array and generates said calibration factor corresponding thereto, said processor generating said calibration factor using a scaling variable and a known screen variable associated with said plurality of engraved areas; and wherein said processor determines a pixel span between at least one pair of engraved areas and determines said scaling variable using said pixel span.

5. The image system as recited in claim 4 wherein said processor uses an average of a plurality of pixel spans to determine said scaling variable, each of said plurality of pixel spans comprising a horizontal pixel span between a pair of engraved areas which are situated in a substantially common horizontal row within said pixel array.

6. The image system as recited in claim 4 wherein said processor uses an average of a plurality of pixel spans to determine said scaling variable, each of said plurality of pixel spans comprising a vertical pixel span between a pair of engraved areas which are situated in a substantially common vertical column within said pixel array.

7. The image system as recited in claim 5 wherein said plurality of pixel spans further comprises a vertical pixel span between a pair of engraved areas which are situated in a substantially common vertical column within said pixel array.

8. An image system for imaging engraved areas on workpieces comprising:

an imager for imaging a plurality of engraved areas on a workpiece and for generating a pixel array corresponding thereto; and a processor coupled to said imager for using said pixel array to generate a calibration factor for use when determining actual measurements for engraved areas subsequently imaged by said imager;

wherein said image calibration factor comprises a ratio defined by the following formula:

$$M=D/P$$

where M is said calibration factor;

P comprises a count of a number of pixels between a first point on a first engraved area and a second point on a second engraved area, wherein a relationship between said first point relative to said first engraved area substantially corresponds to a second relationship of said second point to said second engraved area; and D comprises a distance between said first engraved area and said second engraved area as defined by a desired screen.

9. The image system as recited in claim 8 wherein said first point is a first center of said first engraved area and said second point is a second center of said second engraved area.

10. An image system for imaging engraved areas on workpieces comprising:

an imager for imaging a plurality of engraved areas on a workpiece and for generating a pixel array corresponding thereto; and a processor coupled to said imager for using said pixel array to generate a calibration factor for use when determining actual measurements for engraved areas subsequently imaged by said imager;

wherein said image calibration factor comprises a ratio defined by the following formula:

$$M=D/P$$

where M is said calibration factor;

P comprises an average count of a number of pixels between corresponding points of a plurality of pairs of engraved areas; and D comprises an distance between said plurality of pairs of said engraved areas as defined by a desired screen.

11. An engraver for engraving a cylinder comprising:

an engraving head for engraving a plurality of engraved areas on said cylinder;

a processor for controlling the operation of the engraving head; and an imager for imaging a plurality of engraved areas on a workpiece and for generating a pixel array corresponding thereto;

said processor using said pixel array to generate a calibration factor for use when determining actual measurements for engraved areas subsequently imaged by said imager;

wherein said processor locates at least one pair of said engraved areas using said pixel array and generates said calibration factor corresponding thereto, said processor generating said calibration factor using a scaling variable and a known screen variable associated with said plurality of engraved areas;

wherein said calibration factor comprises a ratio of said scaling variable and said known screen variable; and wherein said scaling variable comprises a number of pixels between said engraved areas.

12. An engraver for engraving a cylinder comprising:

an engraving head for engraving a plurality of engraved areas on said cylinder;

a processor for controlling the operation of the engraving head; and an imager for imaging a plurality of engraved areas on a workpiece and for generating a pixel array corresponding thereto;

said processor using said pixel array to generate a calibration factor for use when determining actual measurements for engraved areas subsequently imaged by said imager;

wherein said processor locates at least one pair of said engraved areas using said pixel array and generates said calibration factor corresponding thereto, said processor generating said calibration factor using a scaling variable and a known screen variable associated with said plurality of engraved areas;

wherein said scaling variable comprises a count of the number of pixels situated between centroids of said plurality of engraved areas.

13. An engraver for engraving a cylinder comprising:

an engraving head for engraving a plurality of engraved areas on said cylinder;

a processor for controlling the operation of the engraving head; and an imager for imaging a plurality of engraved areas on a workpiece and for generating a pixel array corresponding thereto;

said processor using said pixel array to generate a calibration factor for use when determining actual measurements for engraved areas subsequently imaged by said imager;

wherein said processor locates at least one pair of said engraved areas using said pixel array and generates said calibration factor corresponding thereto, said processor generating said calibration factor using a scaling variable and a known screen variable associated with said plurality of engraved areas;

wherein said calibration factor comprises a ratio of said scaling variable and said known screen variable;

wherein said known screen variable comprises a distance defined by a desired screen; and wherein said at least one scaling variable comprises a count of the number of pixels between centroids of said plurality of engraved areas and said known screen variable comprises an actual distance between said engraved areas as defined by said screen associated with said plurality of engraved areas.

14. An engraver for engraving a cylinder comprising:

an engraving head for engraving a plurality of engraved areas on said cylinder;

a processor for controlling the operation of the engraving head; and an imager for imaging a plurality of engraved areas on a workpiece and for generating a pixel array corresponding thereto;

said processor using said pixel array to generate a calibration factor for use when determining actual measurements for engraved areas subsequently imaged by said imager;

wherein said processor locates at least one pair of said engraved areas using said pixel array and generates said calibration factor corresponding thereto, said processor generating said calibration factor using a scaling variable and a known screen variable associated with said plurality of engraved areas; and wherein said processor determines a pixel span between at least one pair of engraved areas and determines said scaling variable using said pixel span.

15. The engraver as recited in claim 14 wherein said processor uses an average of a plurality of pixel spans to determine said scaling variable, each of said plurality of pixel spans comprising a horizontal pixel span between a pair of engraved areas which are situated in a substantially common horizontal row within said pixel array.

16. The engraver as recited in claim 14 wherein said processor uses an average of a plurality of pixel spans to determine said scaling variable, each of said plurality of pixel spans comprising a vertical pixel span between a pair of engraved areas which are situated in a substantially common vertical column within said pixel array.

17. The engraver as recited in claim 15 wherein said plurality of pixel spans further comprises a vertical pixel span between a pair of engraved areas which are situated in a substantially common vertical column within said pixel array.

18. An engraver for engraving a cylinder comprising:

an engraving head for engraving a plurality of engraved areas on said cylinder;

a processor for controlling the operation of the engraving head; and an imager for imaging a plurality of engraved areas on a workpiece and for generating a pixel array corresponding thereto;

said processor using said pixel array to generate a calibration factor for use when determining actual measurements for engraved areas subsequently imaged by said imager; and wherein said image calibration factor comprises a ratio defined by the following formula:

$$M=D/P$$

where M is said calibration factor;

P comprises a count of a number of pixels between a first point on a first engraved area and a second point on a second engraved area, wherein a relationship between said first point relative to said first engraved area substantially corresponds to a second relationship of said second point to said second engraved area; and D comprises a distance between said first engraved area and said second engraved area as defined by a desired screen.

19. The engraver as recited in claim 18 wherein said first point is a first center of said first engraved area and said second point is a second center of said second engraved area.

20. An engraver for engraving a cylinder comprising:

an engraving head for engraving a plurality of engraved areas on said cylinder;

a processor for controlling the operation of the engraving head; and an imager for imaging a plurality of engraved areas on a workpiece and for generating a pixel array corresponding thereto:

said processor using said pixel array to generate a calibration factor for use when determining actual measurements for engraved areas subsequently imaged by said imager; and wherein said image calibration factor comprises a ratio defined by the following formula:

$$M=D/P$$

where M is said calibration factor;

P comprises an average count of a number of pixels between corresponding points of a plurality of pairs of adjacent engraved areas of said CCD array; and D comprises an distance between said plurality of pairs of said engraved areas as defined by a desired screen.

21. An engraver for engraving a cylinder comprising:

an engraving head for engraving a plurality of engraved areas on said cylinder;

a processor for controlling the operation of the engraving head; and an imager for imaging a plurality of engraved areas on a workpiece and for generating a pixel array corresponding thereto;

said processor using said pixel array to generate a calibration factor for use when determining actual measurements for engraved areas subsequently imaged by said imager; and wherein said processor further comprises:

means for generating error signals representing differences between commanded values for said engraved areas and actual measurements for said engraved areas;

means for indicating a warning when a magnitude of said error signals exceeds a predetermined limit value.

22. A method of calibrating an image system for imaging engraved areas on a workpiece, said method comprising the steps of:

capturing an image of said engraved areas and generating a pixel array in response thereto;

generating a calibration factor using said pixel array and a screen variable associated with a desired screen for said engraved areas;

using said calibration factor to determine a measurement for at least one engraved area; and wherein said scaling variable comprises a number of pixels between a pair of said engraved areas.

23. A method of calibrating an image system for imaging engraved areas on a workpiece, said method comprising the steps of:

capturing an image of said engraved areas and generating a pixel array in response thereto;

generating a calibration factor using said pixel array and a screen variable associated with a desired screen for said engraved areas;

using said calibration factor to determine a measurement for at least one engraved area; and;

wherein said method further comprises the steps of:

locating centroids for a plurality of said engraved areas;

using said centroids to generate said calibration factor.

24. The method as recited in claim 23 wherein said method further comprises the steps of:

determining a number of pixels between a plurality of said centroids;

generating said calibration factor as a ratio of said number of pixels to said screen variable associated with said desired screen for said plurality of engraved areas.

25. The method as recited in claim 24 wherein said generating step further comprises the step of:

generating said calibration factor as a ratio of said number of pixels to a known distance between horizontally adjacent centroids.

26. The method as recited in claim 24 wherein said generating step further comprises the step of:

generating said calibration factor as a ratio of said number of pixels to a known distance between vertically adjacent centroids.

27. A method of calibrating an image system for imaging engraved areas on a workpiece, said method comprising the steps of:

capturing an image of said engraved areas and generating a pixel array in response thereto;

generating a calibration factor using said pixel array and a screen variable associated with a desired screen for said engraved areas;

using said calibration factor to determine a measurement for at least one engraved area; and wherein said scaling variable comprises a count of the number of pixels situated between centroids of said plurality of engraved areas.

28. A method of calibrating an image system for imaging engraved areas on a workpiece, said method comprising the steps of:

capturing an image of said engraved areas and generating a pixel array in response thereto;

generating a calibration factor using said pixel array and a screen variable associated with a desired screen for said engraved areas;

using said calibration factor to determine a measurement for at least one engraved area; and wherein said scaling variable comprises a count of the number of pixels between centroids of said plurality of engraved areas and said known screen variable comprises an actual distance between said engraved areas as defined by said screen associated with said plurality of engraved areas.

29. A method of calibrating an image system for imaging engraved areas on a workpiece, said method comprising the steps of:

capturing an image of said engraved areas and generating a pixel array in response thereto;

generating a calibration factor using said pixel array and a screen variable associated with a desired screen for said engraved areas;

using said calibration factor to determine a measurement for at least one engraved area; and determining a pixel span between at least one pair of engraved areas;

generating said scaling variable using said pixel span.

30. A method of calibrating an image system for imaging engraved areas on a workpiece, said method comprising the steps of:

capturing an image of said engraved areas and generating a pixel array in response thereto;

generating a calibration factor using said pixel array and a screen variable associated with a desired screen for said engraved areas;

using said calibration factor to determine a measurement for at least one engraved area; and determining an average of a plurality of pixel spans to determine said scaling variable, each of said plurality of pixel spans comprising a horizontal pixel span between a pair of engraved areas which are situated in a substantially common horizontal row within said pixel array.

31. A method of calibrating an image system for imaging engraved areas on a workpiece, said method comprising the steps of:

capturing an image of said engraved areas and generating a pixel array in response thereto;

generating a calibration factor using said pixel array and a screen variable associated with a desired screen for said engraved areas;

using said calibration factor to determine a measurement for at least one engraved area; and determining an average of a plurality of pixel spans to determine said scaling variable, each of said plurality of pixel spans comprising a vertical pixel span between a pair of engraved areas which are situated in a substantially common vertical column within said pixel array.

32. A method of calibrating an image system for imaging engraved areas on a workpiece, said method comprising the steps of:

capturing an image of said engraved areas and generating a pixel array in response thereto;

generating a calibration factor using said pixel array and a screen variable associated with a desired screen for said engraved areas; and using said calibration factor to determine a measurement for at least one engraved area; and determining said calibration factor using a ratio defined by the following formula:

$$M = D/P$$

where M is said calibration factor;

P comprises a count of a number of pixels between a first point on a first engraved area and a second point on a second engraved area, wherein a relationship between said first point relative to said first engraved area substantially corresponds to a second relationship of said second point to said second engraved area; and D comprises a distance between said first engraved area and said second engraved area as defined by a desired screen.

33. The method as recited in claim 32 wherein said first point is a first center of said first engraved area and said second point is a second center of said second engraved area.

34. A method of engraving comprising the steps of:

mounting a workpiece on an engraver;

capturing an image of engraved areas on said workpiece and generating a pixel array in response thereto;

generating a calibration factor using said pixel array and a screen variable associated with a desired screen for said engraved areas;

using said calibration factor to determine a measurement for at least one engraved area;

adjusting said engraver in response to said measurement;

engraving second engraved areas after performing said adjusting step;

wherein said scaling variable comprises a number of pixels between a pair of said engraved areas.

35. A method of engraving comprising the steps of:

mounting a workpiece on an engraver;

capturing an image of engraved areas on said workpiece and generating a pixel array in response thereto;

generating a calibration factor using said pixel array and a screen variable associated with a desired screen for said engraved areas; and using said calibration factor to determine a measurement for at least one engraved area;

adjusting said engraver in response to said measurement;

engraving second engraved areas after performing said adjusting step; and locating centroids for a plurality of said engraved areas;

using said centroids to generate said calibration factor.

36. The method as recited in claim 35 wherein said method further comprises the steps of:

determining a number of pixels between a plurality of said centroids;

generating said calibration factor as a ratio of said number of pixels to said screen variable associated with said desired screen for said plurality of engraved areas.

37. The method as recited in claim 36 wherein said generating step further comprises the step of;

generating said calibration factor as a ratio of said number of pixels to a known distance between horizontally adjacent centroids.

38. The method as recited in claim 36 wherein said generating step further comprises the step of;

generating said calibration factor as a ratio of said number of pixels to a known distance between vertically adjacent centroids.

39. A method of engraving comprising the steps of:

mounting a workpiece on an engraver;

capturing an image of engraved areas on said workpiece and generating a pixel array in response thereto;

generating a calibration factor using said pixel array and a screen variable associated with a desired screen for said engraved areas; and using said calibration factor to determine a measurement for at least one engraved area;

adjusting said engraver in response to said measurement;

engraving second engraved areas after performing said adjusting step;

wherein said scaling variable comprises a count of the number of pixels situated between centroids of said plurality of engraved areas.

40. A method of engraving comprising the steps of:

mounting a workpiece on an engraver;

capturing an image of engraved areas on said workpiece and generating a pixel array in response thereto;

generating a calibration factor using said pixel array and a screen variable associated with a desired screen for said engraved areas; and using said calibration factor to determine a measurement for at least one engraved area;

adjusting said engraver in response to said measurement;

engraving second engraved areas after performing said adjusting step;

wherein said scaling variable comprises a count of the number of pixels between centroids of said plurality of engraved areas and said known screen variable comprises an actual distance between said engraved areas as defined by said screen associated with said plurality of engraved areas.

41. A method of engraving comprising the steps of:

mounting a workpiece on an engraver;

capturing an image of engraved areas on said workpiece and generating a pixel array in response thereto;

generating a calibration factor using said pixel array and a screen variable associated with a desired screen for said engraved areas; and using said calibration factor to determine a measurement for at least one engraved area;

adjusting said engraver in response to said measurement;

engraving second engraved areas after performing said adjusting step;

wherein said method further comprises the steps of:

determining a pixel span between at least one pair of engraved areas;

generating said scaling variable using said pixel span.

42. A method of engraving comprising the steps of:

mounting a workpiece on an engraver;

capturing an image of engraved areas on said workpiece and generating a pixel array in response thereto;

generating a calibration factor using said pixel array and a screen variable associated with a desired screen for said engraved areas; and using said calibration factor to determine a measurement for at least one engraved area;

adjusting said engraver in response to said measurement;

engraving second engraved areas after performing said adjusting step;

wherein said method further comprises the steps of:

determining an average of a plurality of pixel spans to determine said scaling variable, each of said plurality of pixel spans comprising a horizontal pixel span between a pair of engraved areas which are situated in a substantially common horizontal row within said pixel array.

43. A method of engraving comprising the steps of:

mounting a workpiece on an engraver;

capturing an image of engraved areas on said workpiece and generating a pixel array in response thereto;

generating a calibration factor using said pixel array and a screen variable associated with a desired screen for said engraved areas; and using said calibration factor to determine a measurement for at least one engraved area;

adjusting said engraver in response to said measurement;

engraving second engraved areas after performing said adjusting step;

wherein said method further comprises the steps of:

determining an average of a plurality of pixel spans to determine said scaling variable, each of said plurality of pixel spans comprising a vertical pixel span between a pair of engraved areas which are situated in a substantially common vertical column within said pixel array.

44. A method of engraving comprising the steps of:

mounting a workpiece on an engraver;

capturing an image of engraved areas on said workpiece and generating a pixel array in response thereto;

generating a calibration factor using said pixel array and a screen variable associated with a desired screen for said engraved areas; and using said calibration factor to determine a measurement for at least one engraved area;

adjusting said engraver in response to said measurement;

engraving second engraved areas after performing said adjusting step;

determining said calibration factor using a ratio defined by the following formula:

$$M = D/P$$

where M is said calibration factor;

P comprises a count of a number of pixels between a first point on a first engraved area and a second point on a second engraved area, wherein a relationship between said first point relative to said first engraved area substantially corresponds to a second relationship of said second point to said second engraved area; and D comprises a distance between said first engraved area and said second engraved area as defined by a desired screen.

45. The method as recited in claim 44 wherein said first point is a first center of said first engraved area and said second point is a second center of said second engraved area.

46. A method of engraving comprising the steps of:

mounting a workpiece on an engraver;

capturing an image of engraved areas on said workpiece and generating a pixel array in response thereto;

generating a calibration factor using said pixel array and a screen variable associated with a desired screen for said engraved areas; and using said calibration factor to determine a measurement for at least one engraved area;

adjusting said engraver in response to said measurement;

engraving second engraved areas after performing said adjusting step;

generating command signals corresponding to commanded dimensions for engraving said engraved areas;

determining said measurement;

adjusting said command signals in correspondence with differences between said measurement and a commanded dimensions.

47. The method as recited in claim 46 wherein said method further comprises the step of:

performing said adjusting step during real-time operation.

* * * * *